United States Patent [19]
Okamoto et al.

[11] Patent Number: 5,764,893
[45] Date of Patent: Jun. 9, 1998

[54] VIDEO-ON-DEMAND SYSTEM USES ADJUSTING POSITIONS OF SLOTS IN A SLOT TABLE TO ADDRESS ADDITIONAL IMAGE DATA DISTRIBUTION REQUEST FROM TERMINAL DEVICES

[75] Inventors: Tadashi Okamoto, Osaka; Koji Zaiki, Kadoma; Shinji Sasaki; Shinji Furuya, both of Osaka, all of Japan

[73] Assignee: Matsushita Electrical Co. Ltd., Osaka, Japan

[21] Appl. No.: 509,738

[22] Filed: Aug. 1, 1995

[30] Foreign Application Priority Data

Aug. 3, 1994 [JP] Japan .................................. 6-182431
Sep. 19, 1994 [JP] Japan .................................. 6-223221

[51] Int. Cl.⁶ .................................................. G06F 12/02
[52] U.S. Cl. ......................... 395/200.08; 395/200.09; 395/894; 395/477; 364/413.22; 348/7
[58] Field of Search .................. 365/189.02; 364/514 R; 348/7; 386/69; 395/477, 200.08, 200.09

[56] References Cited

U.S. PATENT DOCUMENTS

| 5,487,035 | 1/1996 | Nishimura et al. | 365/189.02 |
| 5,553,005 | 9/1996 | Voeten et al. | 364/514 R |
| 5,568,180 | 10/1996 | Okamoto | 348/7 |
| 5,612,790 | 3/1997 | Sakamoto et al. | 386/69 |

FOREIGN PATENT DOCUMENTS 4269087  9/1992  Japan .

Primary Examiner—Thomas C. Lee
Assistant Examiner—David Ton
Attorney, Agent, or Firm—Price, Gess & Ubell

[57] ABSTRACT

A video-on-demand system divides compressed image data of a video program into image data sections with a predetermined length and stores them in one of a series of storage media in order of reproduction, returning to a first storage medium in the series after reaching a final storage medium in the series, along a story of the video program. The image data sections stored in the storage media are read by time sharing and the original images are reproduced and displayed.

16 Claims, 33 Drawing Sheets

FIG. 6

|  | slot numbers | | | |
|---|---|---|---|---|
|  | TS1 | TS2 | TS3 | TS4 |
| HD1 | T1 | T2 | T3 | ///// |
| hard disk HD2 | T4 | ///// | ///// | ///// |
| numbers HD3 | T5 | T6 | T7 | T8 |
| HD4 | T9 | T10 | T11 | T12 |

T1~12:terminal devices

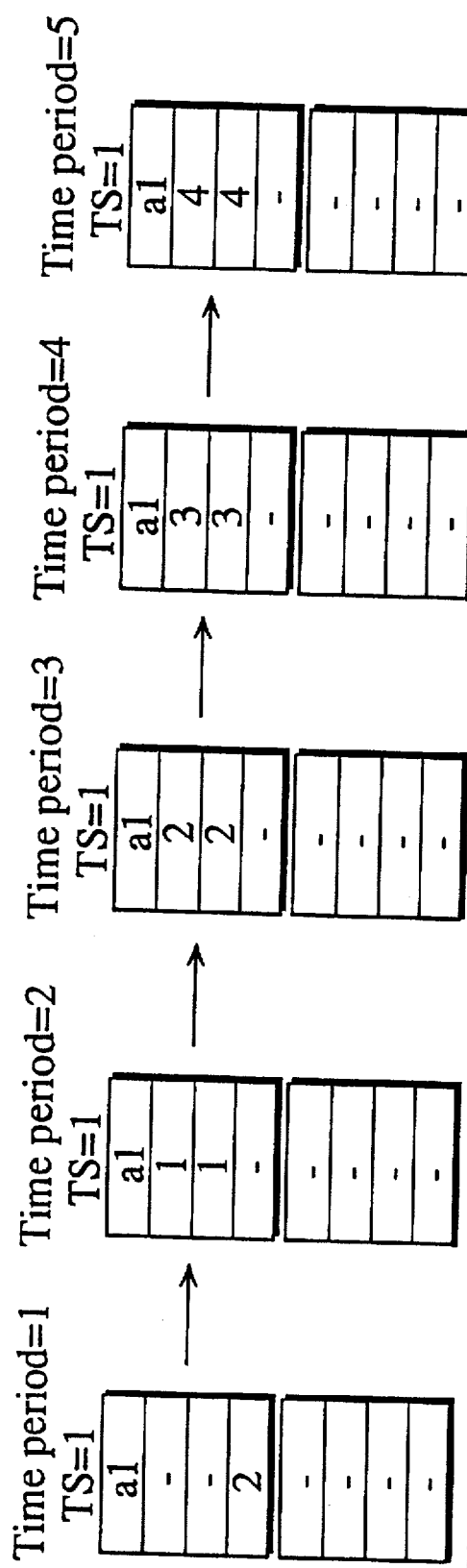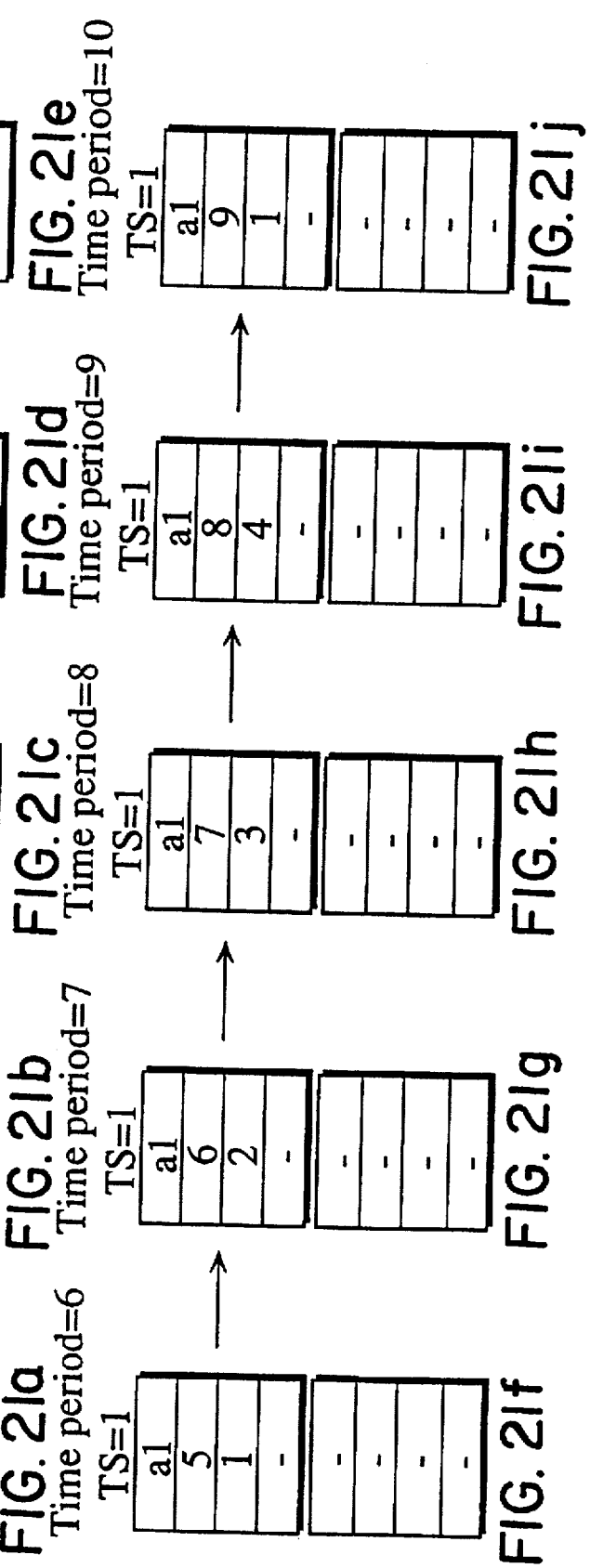

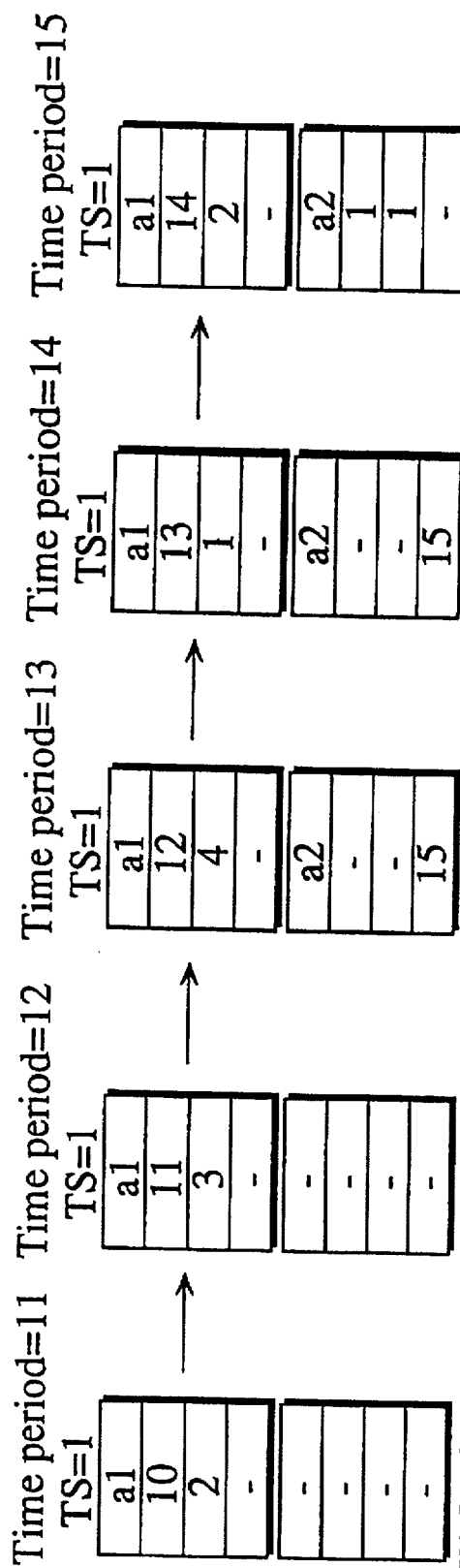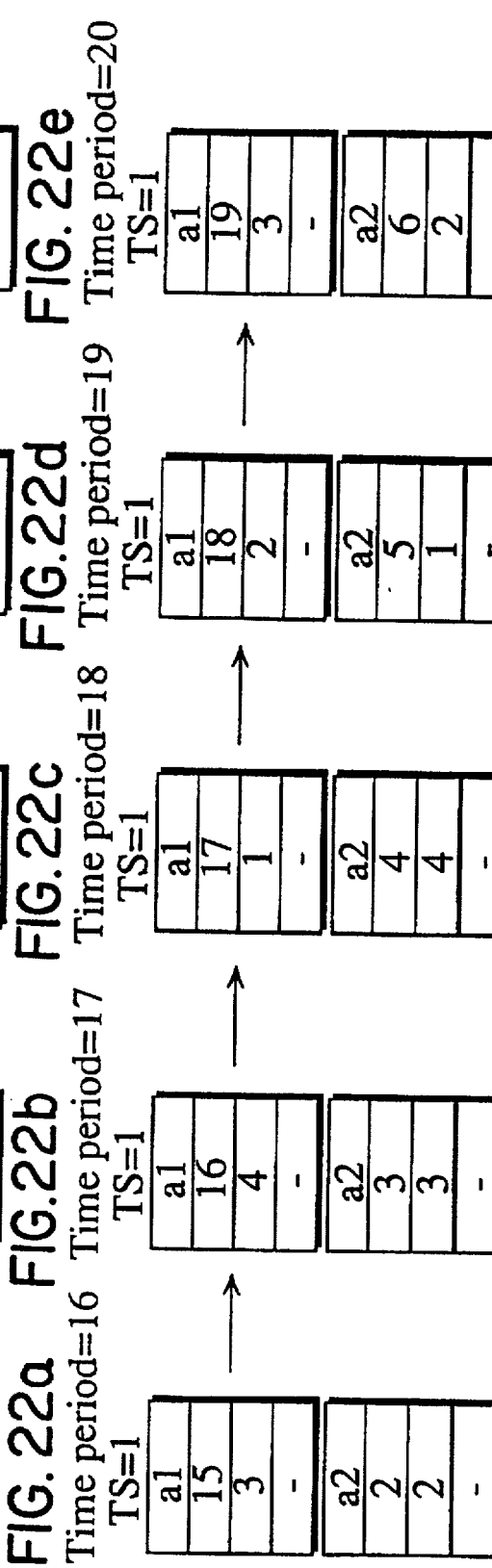

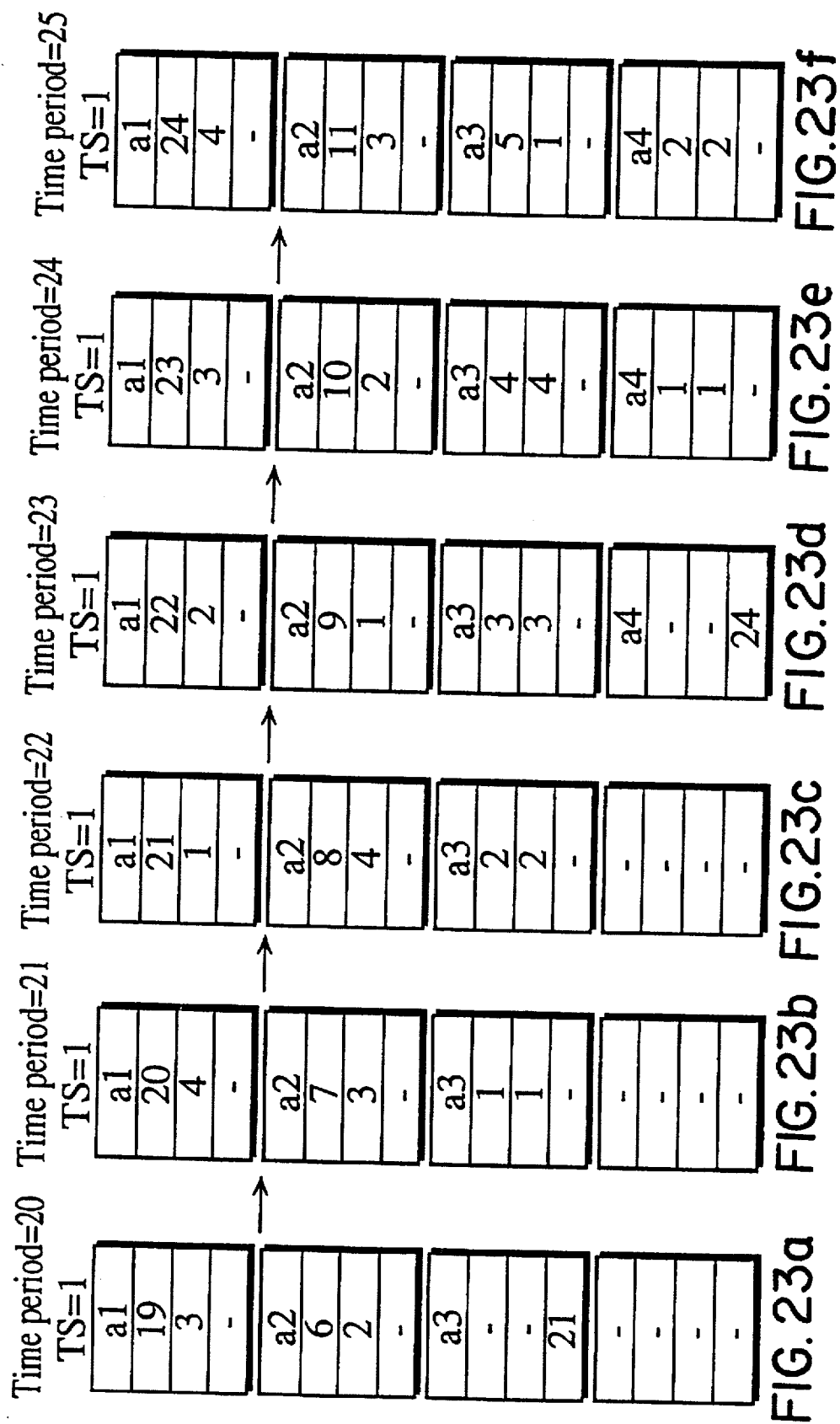

FIG. 26 slot numbers

| | TS=1 | TS=2 | TS=3 | TS=4 |
|---|---|---|---|---|
| data transmission device21 | a1<br>4N+3<br>3<br>- | b2<br>4M'+3<br>3<br>- | c3<br>4O+4<br>4<br>- | d4<br>4P+1<br>1<br>- |
| data transmission device22 | a2<br>4M+2<br>2<br>- | b3<br>4O'+4<br>4<br>- | c4<br>4P'+1<br>1<br>- | d1<br>4N'''+2<br>2<br>- |
| data transmission device23 | a3<br>4O''+4<br>4<br>- | b4<br>4P''+1<br>1<br>- | c1<br>4N''+2<br>2<br>- | d2<br>4M''''+3<br>3<br>- |
| data transmission device24 | a4<br>4P'''+1<br>1<br>- | b1<br>4N'+2<br>2<br>- | c2<br>4N''+3<br>3<br>- | d3<br>4O'''+4<br>4<br>- |

FIG. 32 a slot table

TP1

|  | TS1 | TS2 | TS3 | TS4 |
|---|---|---|---|---|
| HD1 | T1 | T5 | T9 | T13 |
| HD2 | T2 | T6 | T10 | T14 |
| HD3 | T3 | T7 | T11 | T15 |
| HD4 | T4 | T8 | T12 | T16 |

⇒

TP2

|  | TS1 | TS2 | TS3 | TS4 |
|---|---|---|---|---|
| HD1 | T4 | T8 | T12 | T16 |
| HD2 | T1 | T5 | T9 | T13 |
| HD3 | T2 | T6 | T10 | T14 |
| HD4 | T3 | T7 | T11 | T15 |

FIG. 32 b contents of network memory

TP1

| (1111) T1 | (1121) T2 | (1131) T3 | (1141) T4 | →T1~T4 |
| (1112) T5 | (1122) T6 | (1132) T7 | (1142) T8 | →T5~T8 |
| (1113) T9 | (1123) T10 | (1133) T11 | (1143) T12 | →T9~T12 |
| (1114) T13 | (1124) T14 | (1134) T15 | (1144) T16 | →T13~T16 |

↑ HD1  ↑ HD2  ↑ HD3  ↑ HD4

⇒

TP2

| (1111) T4 | (1121) T1 | (1131) T2 | (1141) T3 | →T1~T4 |
| (1112) T8 | (1122) T5 | (1132) T6 | (1142) T7 | →T5~T8 |
| (1113) T12 | (1123) T9 | (1133) T10 | (1143) T11 | →T9~T12 |
| (1114) T16 | (1124) T13 | (1134) T14 | (1144) T15 | →T13~T16 |

↑ HD1  ↑ HD2  ↑ HD3  ↑ HD4

VIDEO-ON-DEMAND SYSTEM USES ADJUSTING POSITIONS OF SLOTS IN A SLOT TABLE TO ADDRESS ADDITIONAL IMAGE DATA DISTRIBUTION REQUEST FROM TERMINAL DEVICES

BACKGROUND OF THE INVENTION (1) Field of the Invention

The present invention relates to a video-on-demand system which provides video programs to subscribers, a slot position adjusting method and an image data readout/transmission method in a video on demand system.

(2) Description of the Related Art

A conventional video-on-demand system is disclosed in Japanese Laid-open Patent Application No. 4-269087. As shown in FIG. 1, the conventional video-on-demand system includes a storage device 1, a data transmission device 2, buffer memories 31–46, terminal device T1–T16, and a control device 5.

The storage device 1 is composed of magnetic hard disks 1–4 (hereinafter HD1–HD4) which store compressed video/audio data and other control data all of which are referred to as image data.

As shown in FIG. 2, the image data are divided into a plurality of smaller image data with a fixed length which is called a frame determined by the compression standard, MPEG1, and sequentially stored in HD1–HD4. For example, image data for a video program a1 are divided into 500 pieces of smaller image data which are numbered a1-001 to a1-500, respectively. Then, a1-001 to a1-004 are respectively stored in HD1 to HD4 with the same address, and a1-005 to a1-008 are respectively stored in HD1 to HD4 with the same address, as so on. This allows image data stored in HD1–HD4 to be read out in serial and its original images to be reproduced without interruption.

As disclosed in the above-mentioned Japanese Laid-open Patent Application No. 4-269087, such a storage makes it possible to address a large number of requests from subscribers for the same video program at the same time only by shifting the time to start to read out its image data, and to obtain desired image data only by retrieving its address in the hard disk. In this case, the readout of image data must always be started at HD1 because it stores the initial image data.

The data transmission device 2 is connected with the storage device 1, and further with the terminal devices T1–T16 to which image data are distributed via the buffer memories 31–46. The data transmission device 2 receives image data from each of HD1–HD4 per frame and distributes them into the buffer memories 31–46.

The buffer memories 31–46 temporarily store the image data received from the data transmission device 2, extend and forward them to a respective one of the terminal devices T1–T16 where the original images corresponding to the image data are reproduced and displayed. To reproduce and display images effectively, each of the buffer memories 31–46 is provided with two areas BUF1 and BUF2, each of which can store image data for one frame, and image data are read or written therefrom/thereto alternately.

The control device 5, which is connected with the data transmission device 2 and each of the terminal devices T1–T16, receives distribution request signals from the terminal device T1–T16, and makes the image data stored in the storage device 1 be written to the buffer memories 31–46 per predetermined time period by time sharing through the switching operation of the data transmission device 2.

Although the storage device 1 is provided with a control unit such as CPU and the terminal devices T1–T16 are provided with buffers, they are not illustrated or explained because they are well-known.

The following description is on the readout, transfer, and reproduction of image data in the conventional video-on-demand system.

The image data read out of the storage device 1 are transferred to the data transmission device 2 per time period by time sharing. One time period, which is also referred to as TP consists of 4 time slots. Each time slot, which is also referred to as TS, corresponds to the time required for reading out one divided image data. FIG. 3 shows the relationship between time slots and time periods. Image data are transferred from each of HD1–HD4 to the buffer memories 31–46 in one time slot and temporarily stored there. This means that 4 buffer memories receive the image data. Consequently, all the 16 buffer memories 31–46 receive image data in one time period, or in 4 time slots. The image data thus received are extended and transferred to corresponding terminal devices where the original images are reproduced and displayed in 4 time slots. FIG. 4 shows the extension of compressed image data.

These procedures are repeated by using two storage areas, BUF1 and BUF2 in turn which are provided in each of the buffer memories 31–46 to distribute image data to the terminal devices T1–T16 without interruption as shown in FIG. 3.

In FIG. 3, BUF1 of the buffer memory 46 connected with the terminal device T16 receives first image data assigned to the time slot TS4 in the first time period, and the terminal device T16 reproduces and displays the original images in the second time period. Then, BUF2 of the buffer memory 46 receives second image data assigned to the time slot TS4 in the second time period, and the terminal device T16 reproduces and displays the images in the third time period. In the time slot TS4 of the third time period, BUF1 of the buffer memory 46 receives third image data, and the terminal device T16 reproduces and displays the images corresponding to the third image data in the fourth time period. The same operation is repeated and as a result, the terminal device T16 can reproduce and display original images without interruption. These procedures are carried out in the same manner for the other terminal devices as shown in FIG. 5.

Each of the terminal devices T1–T16 is given the right to read desired image data from HD1–HD4 by the control device 5.

FIG. 6 shows a slot table held by the control device 5 by which to control the slot assignment. As shown in the slot table, one readout of image data from HD1–HD4 is performed in one time slot, and 4 time slots are equal to 1 minute. Since each of HD1–HD4 is provided with 4 time slots, one of the total of 16 time slots is assigned to each of the terminal devices T1–T16. The shaded boxes in the table indicate free slots with no assignment. The readout of image data from HD4 to the terminal devices T9–T12 is shown in FIG. 5.

FIG. 7 shows the transition of the contents of the slot table from the time period TP1 to the time period TP4. As the time period proceeds, a terminal device is assigned a time slot in the next hard disk. By distributing image data to the terminal devices T1–T16 based on the time slot table, the original images corresponding to the image data divided are reproduced without interruption. When the transmission of the final image data is completed, all the terminal devices are erased from the time slot table.

In this conventional video-on-demand system, however, slots to be assigned to the terminal devices T1–T16 are limited to those initially registered to the time slot table. Therefore, a terminal device which has received the readout right must wait for a free slot to come which belongs to HD1 storing the initial image data. However, as the number of hard disks becomes larger, it takes more time for a terminal device to get a free slot, which makes it harder to respond to the distribution request from the terminal devices T1–T16.

A changeover switch shown in FIG. 1 is used to properly read image data from HD1–HD4 and to properly transmit them to terminal devices T1–T16. In order to increase the number of terminal devices, it is necessary to increase the data reading speed of the storage device 1, the data transferring speed and the switching speed of the data transmission device 2.

It is possible to obtain 5 or 6 times more terminal devices, but it seems to be extremely difficult to obtain 10 times more from the current switch hardware technology.

However, to provide more than one such video-on-demand system for the purpose of solving these problems is uneconomical because each storage device 1 must store the same video data. It is also uneconomical to store data for high-speed transmission or rewinding operation separately from the data for normal-speed transmission, or to assign two or three slots to one terminal device at the same time because the readout speed of the storage device 1 and the transmission capacity are limited.

SUMMARY OF THE INVENTION

In view of the foregoing problems, a first object of the present invention is to provide a video-on-demand system which can quickly address image data distribution requests from terminal devices even there are a large number of storage devices.

A second object of the present invention is to provide a video-on-demand system which can quickly address an additional image data distribution request even in the case where image data are already distributed to a large number of terminal devices.

A third object of the present invention is to provide a video-on-demand system which can address an image data forwarding or rewinding request from a specific terminal device.

A fourth object of the present invention is to provide a video-on-demand system which can distribute a large amount of image data to a large number of terminal devices.

A fifth object of the present invention is to provide a inexpensive video-on-demand system.

The first and second objects can be achieved by a video-on-demand system comprising the following:

a storage unit for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout units for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of terminal units for making requests for desired video programs and displaying the video programs;

a program request reception unit for receiving the requests from the terminal devices;

a terminal device control unit for holding information on the requests received by the program request reception unit;

a plurality of buffer memories each provided for a respective one of the terminal devices, each of the buffer memories having at least three storage areas for temporarily storing the image data sections which have been read by the readout units in one time;

a plurality of buffer memory control units for determining a storage area of each of the buffer memories to store each of the image data sections which have been read out by the read-out units and for determining a time to transfer the image data sections temporarily stored in each storage area to the terminal devices along the story of the video program;

an image data transmission unit for transmitting the temporarily stored image data sections to the terminal devices at the time determined by the buffer memory control units;

a time period recognition unit for recognizing every time period;

a readout number recognition unit for recognizing a number of reading the image data sections from the storage media in every recognized time period;

a slot table formation unit for forming a slot table which shows each of the image data sections to be read from each of the storage media by each of the terminal devices in every time period in every number of reading the image data sections recognized by the readout number recognition unit, and for giving a readout right to each of the terminal devices;

a readout control unit for making each of the readout units read the image data sections of a requested video program from the series of the storage media by referring to the slot table and the information held by the terminal device control unit;

a slot table update unit for controlling the slot table formation unit to update the slot table and to give each of the terminal devices the readout right, based on the recognized time period;

a free slot detection unit for detecting a free slot, which is not assigned any terminal device, by referring to the slot table;

a pre-read control unit for, in response of a detection of a free slot, controlling the slot table update unit to assign the free slot and a next slot to a terminal device which is originally assigned to the next slot, to pre-read image data sections, and to store the pre-read image data sections in the at least three storage areas of a corresponding buffer memory;

a slot deletion unit for, when the terminal device assigned two consecutive slots is detected, controlling the slot table update unit to delete a latter slot of the two consecutive slots by referring to the slot table;

a slot position change unit for changing positions of slots in the slot table by controlling the pre-read control unit and the slot deletion unit; and a free slot separation unit for, when there are a plurality of free slots, separating the plurality of free slots at an equal interval by controlling the slot position change unit.

The first and second objects can be also achieved by a method for adjusting positions of slots in a video-on-demand system comprising the steps of:

detecting a free slot, which is not assigned any terminal device, by referring to the slot table;

assigning the free slot and a next slot to a terminal device which is originally assigned to the next slot, pre-reading image data sections, and storing the pre-read image data sections in the at least three storage areas of a corresponding buffer memory, in response of a detection of a free slot;

deleting a latter slot of the two consecutive slots by referring to the slot table, when the terminal device assigned two consecutive slots is detected;

changing positions of slots in the slot table; and separating the plurality of free slots at an equal interval, when there are a plurality of free slots.

The third object can be achieved by providing a free-slot-use different-speed transmission unit or step for, when a terminal device has made a request for a video program at a different reproduction speed from a normal reproduction speed, judging a presence or absence of free slots separated by the free slot separation unit and for, if the free slots are present, controlling the slot table update unit to transmit image data sections for the video program at a requested reproduction speed by using the separated free slots.

The fourth object can be achieved by further providing the following units:

a plurality of image data transmission units for transmitting image data sections to at least one of the terminal devices in order of reproduction;

a plurality of memories for temporarily storing image data sections which have been read from a specified one of the storage media and distributing the image data sections to a specified one of the data transmission devices;

a plurality of horizontal buses for transmitting image data sections which have been read from the specified one of the storage media serially to the memories;

a plurality of vertical buses for transmitting the image data sections which are temporarily stored in the memories serially to the image data transmission units; and a horizontal/vertical bus control unit for controlling the horizonal buses and the vertical buses to avoid an occurrence of slot collision and further controlling the slot table formation unit to give the readout right without causing a collision.

The fourth object can be achieved also by providing the image data transmission units with the following:

a synchronization signal reception unit for receiving the synchronization signals;

a slot table copy/storage unit for copying and storing the slot table held by the master unit, based on a received synchronization signal, every time the slot table is updated; and a synchronization control unit for making the readout units read image data sections from the storage media and transfer the image data sections to the horizontal buses, making the image data transmission units read image data sections from the vertical buses and transmit the image data sections to a corresponding terminal device, and further making the horizonal/vertical bus control unit control the horizontal buses and the vertical buses, by referring to the slot table held in the slot table copy/storage unit and by using the synchronization signal received by the synchronization signal reception unit.

The fifth object can be achieved by further providing the steps of:

transferring image data sections read from each of the storage media serially to the memories and temporarily storing the image data sections transferred in the memories; and transferring image data sections which are temporarily stored in the memories to the image data transmission units by reading the image data sections serially.

The fifth object can be also achieved by further providing the steps of:

generating synchronization signals related at least to the step of forming the slot table;

receiving the synchronization signals;

copying and storing the slot table, based on a received synchronization signal, every time the slot table is updated; and controlling readout of image data sections from the vertical buses and transmission of the image data sections to a corresponding terminal device, and further controlling the horizontal buses and the vertical buses by referring to the slot table and the synchronization signal received.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows a slot table to be used for controlling slot assignment.

FIG. 21(a)–(j) show the transition of the contents of the control table of the third embodiment.

FIG. 22(a)–(j) show the transition following FIG. 21(a)–(j).

FIG. 23(a)–(f) show the transition following FIG. 21(a)–(j).

FIG. 26 shows the transition the contents of the control table in the time period K+1.

FIGS. 32a and 32b show the relationship between the slot table used in first and second embodiment and storage positions of image data for each terminal device in the network 20.

DESCRIPTION OF THE PREFERRED EMBODIMENT

The present invention in accordance with embodiments will be explained with reference to attached drawings.

<EMBODIMENT 1>

Figure 8:
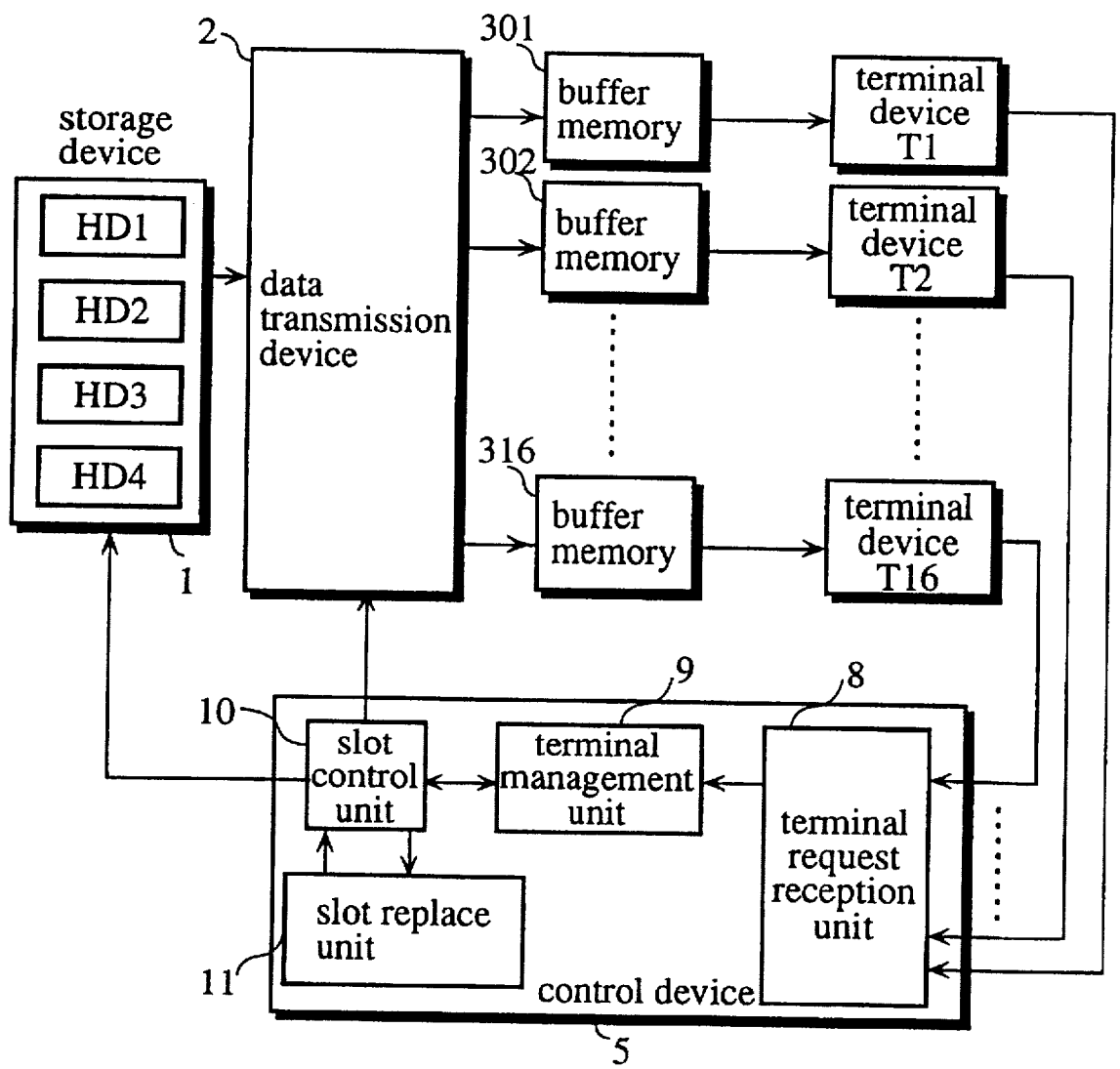
FIG. 8 shows the construction of the video-on-demand system according to the first embodiment of the present invention.

The construction of the video-on-demand system according to the first embodiment of the present invention is shown in FIG. 8.

The video-on-demand system is provided with a storage device 1, a data transmission device 2, buffer memories 301–316, terminal devices T1–T16, and a control device 5.

The storage device 1 is composed of magnetic hard disks 1–4 (hereinafter HD1–HD4), which store image data in the same manner as in the conventional system. The image data to be stored in HD1–HD4 are divided and compressed in the same manner as the conventional system so as to be reproduced per time period; however, the image data are outputted to the data transmission device 2 under the control of a slot control unit 10 provided in the control device 5.

The control device 5 controls the storage device 1 and the data transmission device 2 in accordance with distribution request signals sent from the terminal devices T1–T16 as in the conventional system; however, the control device 5 in the present embodiment includes a terminal request reception unit 8, a terminal management unit 9, the above-mentioned slot control unit 10, and a slot replace unit 11.

The data transmission device 2 writes image data stored in the storage device 1 to the buffer memories 301–316 per time period by distributing them by time sharing under the control of the slot control unit 10.

The buffer memories 301–316 temporarily store image data read from the storage device 1 as in the conventional system; however, each of the buffer memories 301–316 has three areas to store the divided image data. Since each area can store a piece of divided image data, each buffer memory can store three pieces of divided image data at the same time.

The terminal devices T1–T16 reproduce and display original images corresponding to the image data extended in the same manner as in the conventional system.

The terminal request reception unit 8 receives distribution request signals from the terminal devices T1–T16.

The terminal management unit 9 preserves information sent by means of the distribution request signals, thereby managing the state of the terminal devices T1–T16.

The slot control unit 10 holds a slot table for assigning the slots to the terminal devices T1–T16, based on the information sent from the terminal management unit 9. The slot control unit 10 controls image data readout of the storage device 1 per time slot and image data writing to the buffer memories 401–416.

The slot replace unit 11 monitors free slots in the slot table held in the slot control unit 10 and directs the slot control unit 10 to change the slot assignment.

The following is a detailed description on the precess and control of image data.

The HD1–HD4 sequentially store compressed image data which are divided into smaller image data with a fixed length. The original images can be reproduced without interruption by reading out the image data sequentially from HD1, HD2, HD3, and HD4 in this order. The fixed length in the present embodiment is one second which is twice as long as the standard of MPEG1. Consequently, 4 time slots corresponding to one time period is one second.

The image data read out are processed in the buffer memories 301–316 as follows.

When the terminal request reception unit 8 receives a distribution request signal before a certain time slot, image data are read out from any of HD1–HD4 and written to the buffer memory connected with the terminal device which has been outputted the distribution request signal, in the same manner as in the conventional system.

However, since each of the buffer memories 301–316 has three areas for storing three pieces of divided image data, if image data are properly stored in the three areas, the terminal devices T1–T16 can reproduce and display the original images without interruption.

Figure 1:
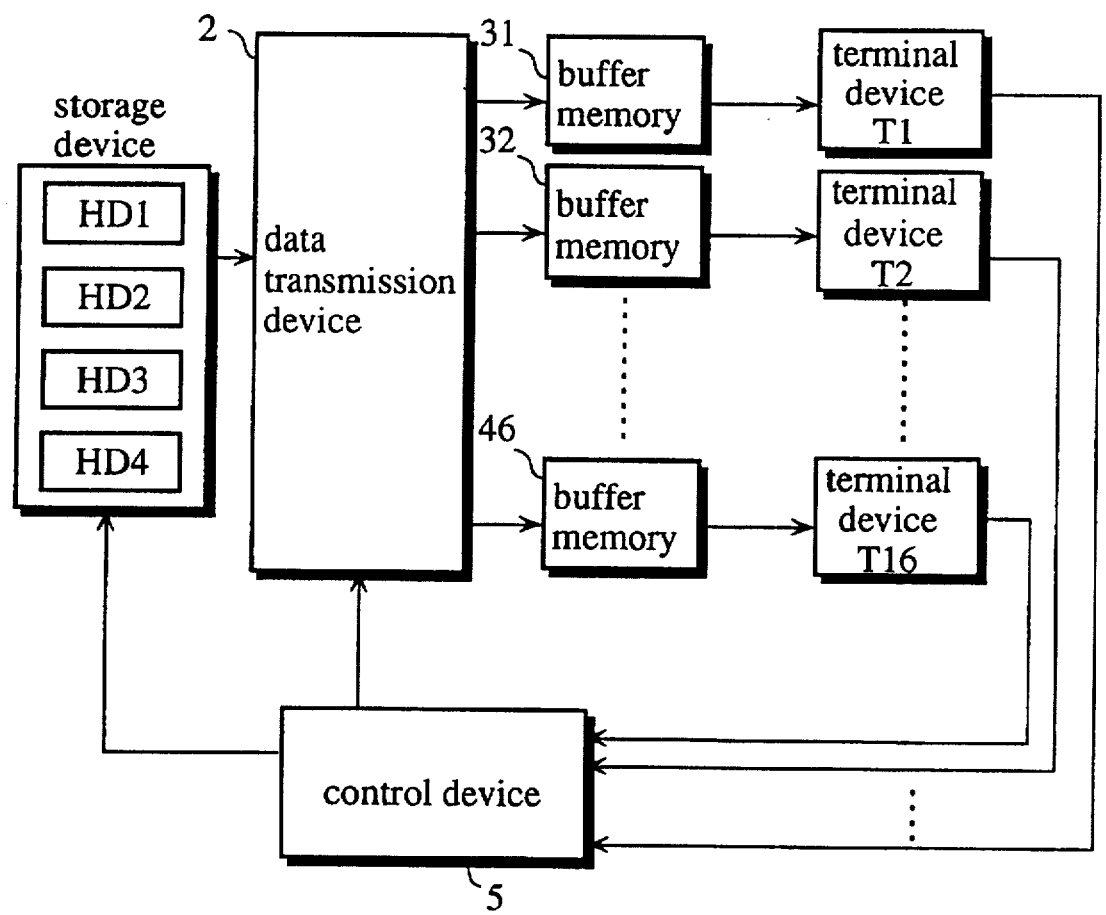
FIG. 1 shows the construction of the conventional video-on-demand system.
Figure 2:
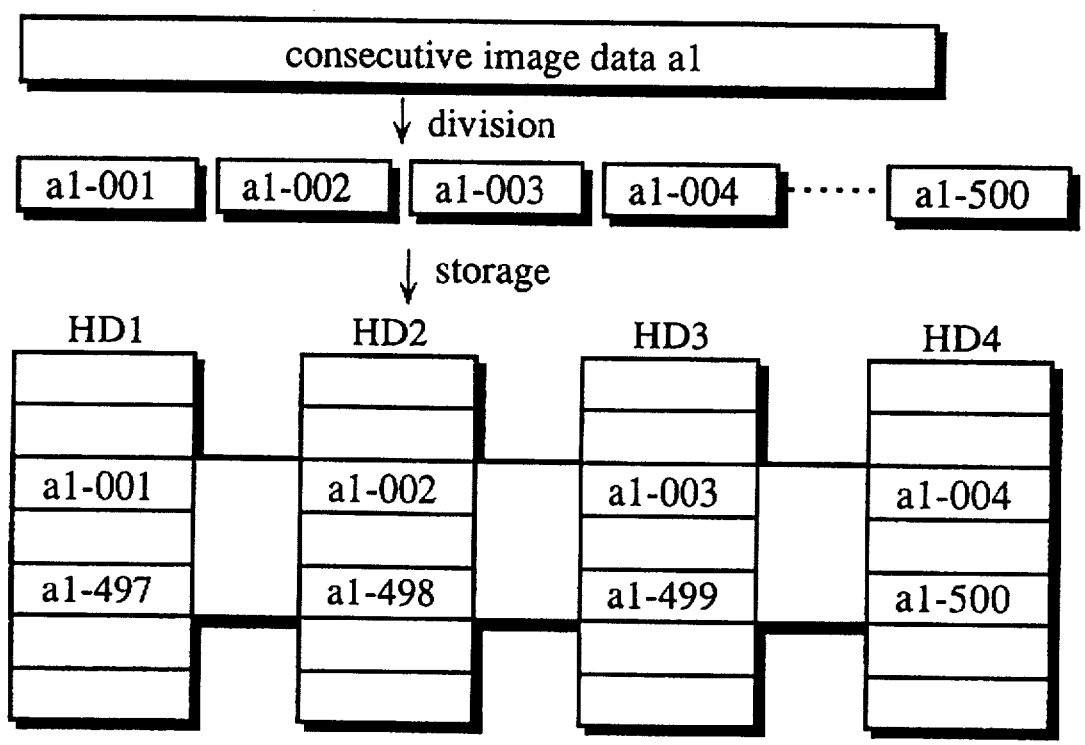
FIG. 2 shows the storage of compressed image data in hard disks.
Figure 3:
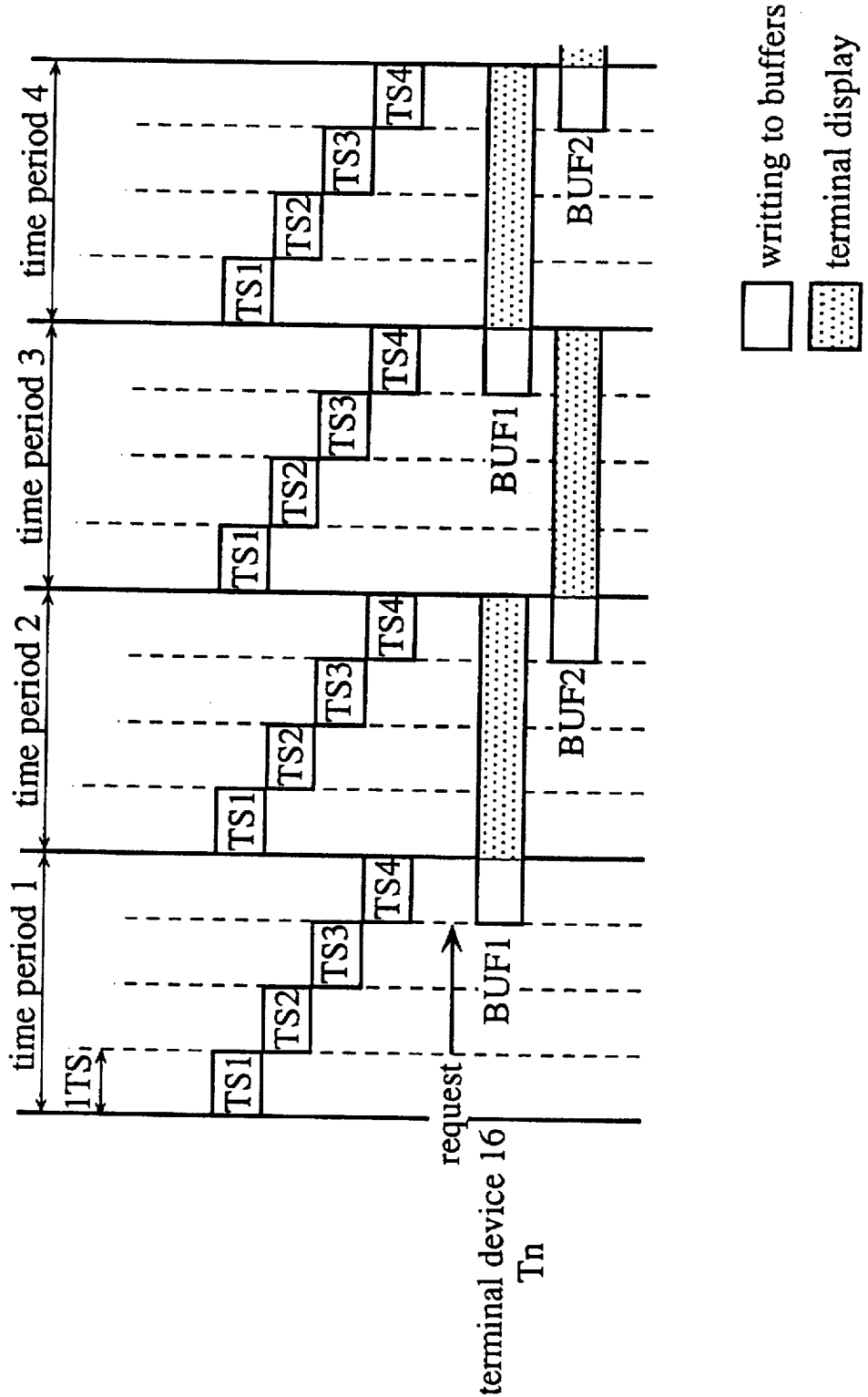
FIG. 3 shows the relationship between time periods and time slots.
Figure 9:
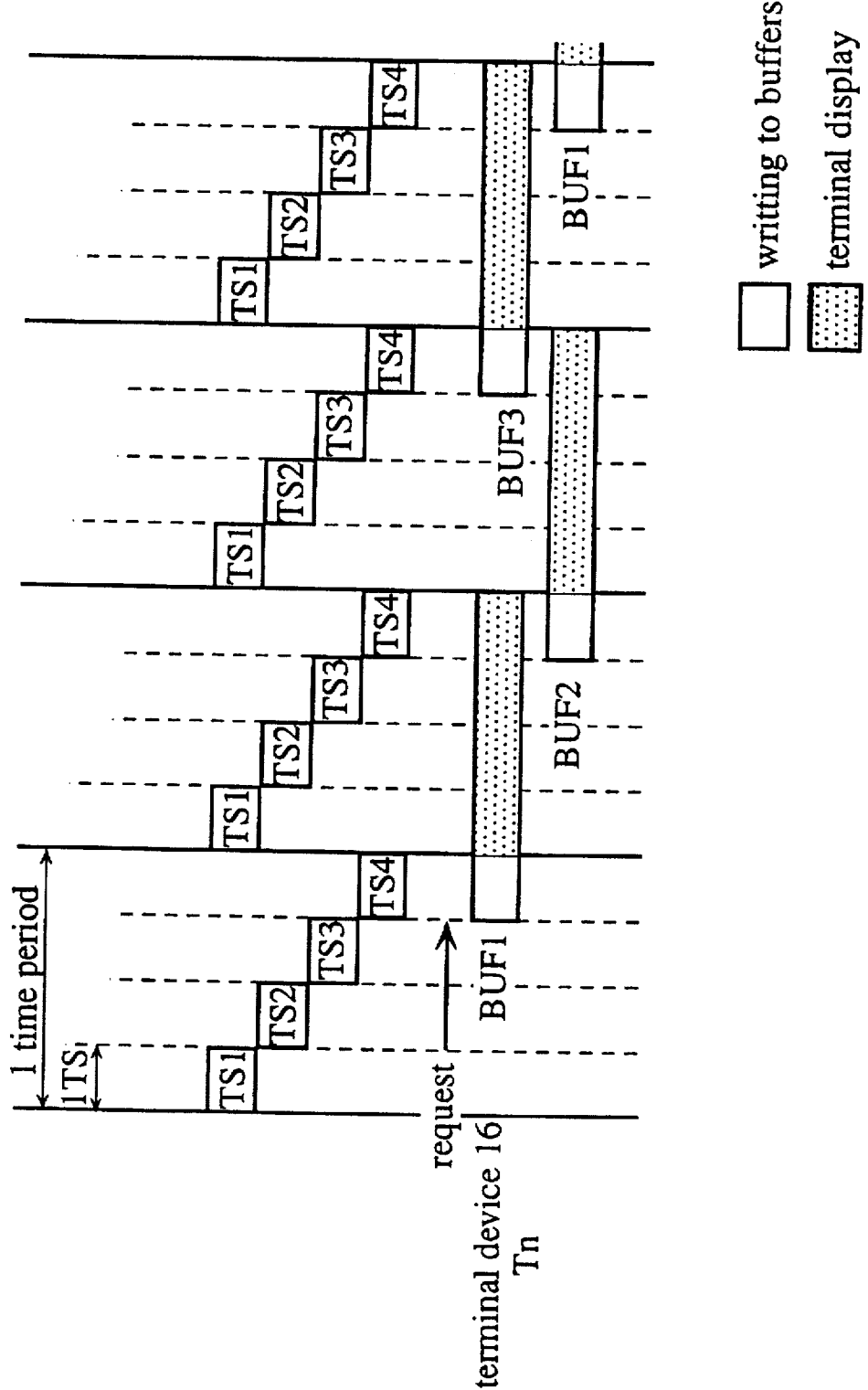
FIG. 9 shows image data stored in each storage area of the buffer memory.

In transferring ordinary image data, two of the three areas are respectively used for reading and transferring data, as shown in FIG. 9, which corresponds to FIG. 3 for the conventional system.

Figure 4:
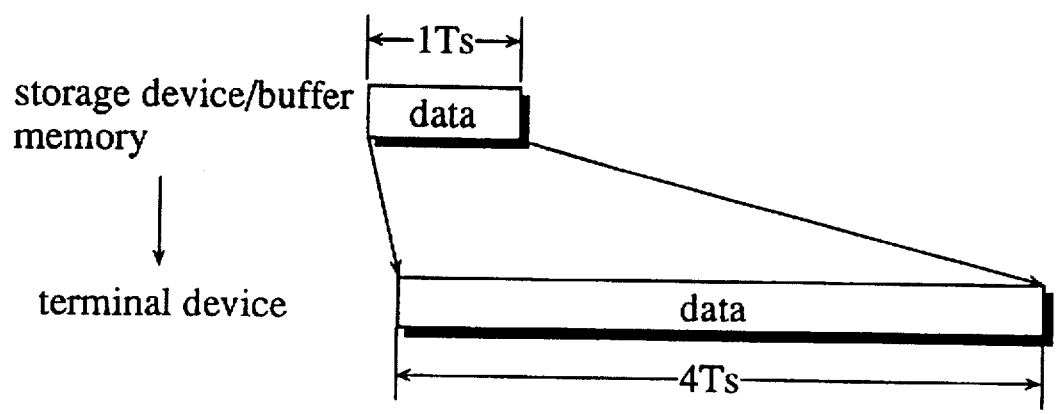
FIG. 4 shows the relationship between compressed image data and extended image data.
Figure 5:
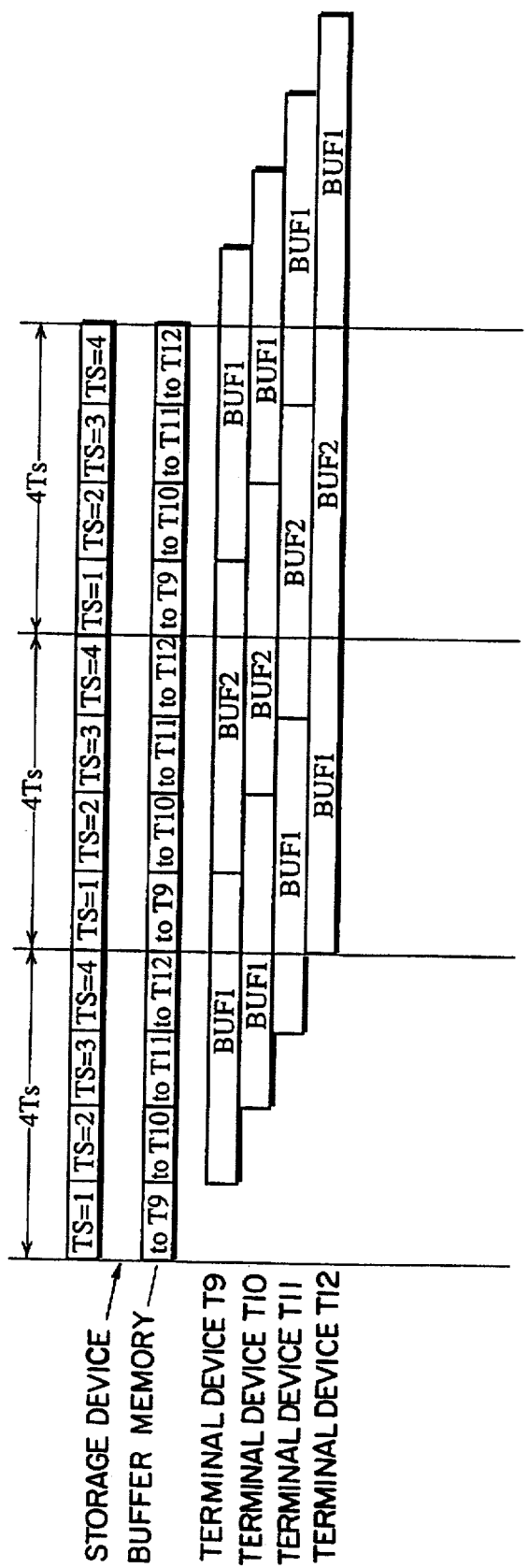
FIG. 5 shows image data are read out from each time slot and extended in the terminal devices.

The expansion of compressed data and the transfer of read data are carried out in the same manner as those in the conventional system shown in FIGS. 4 and 5, respectively.

Figure 7:
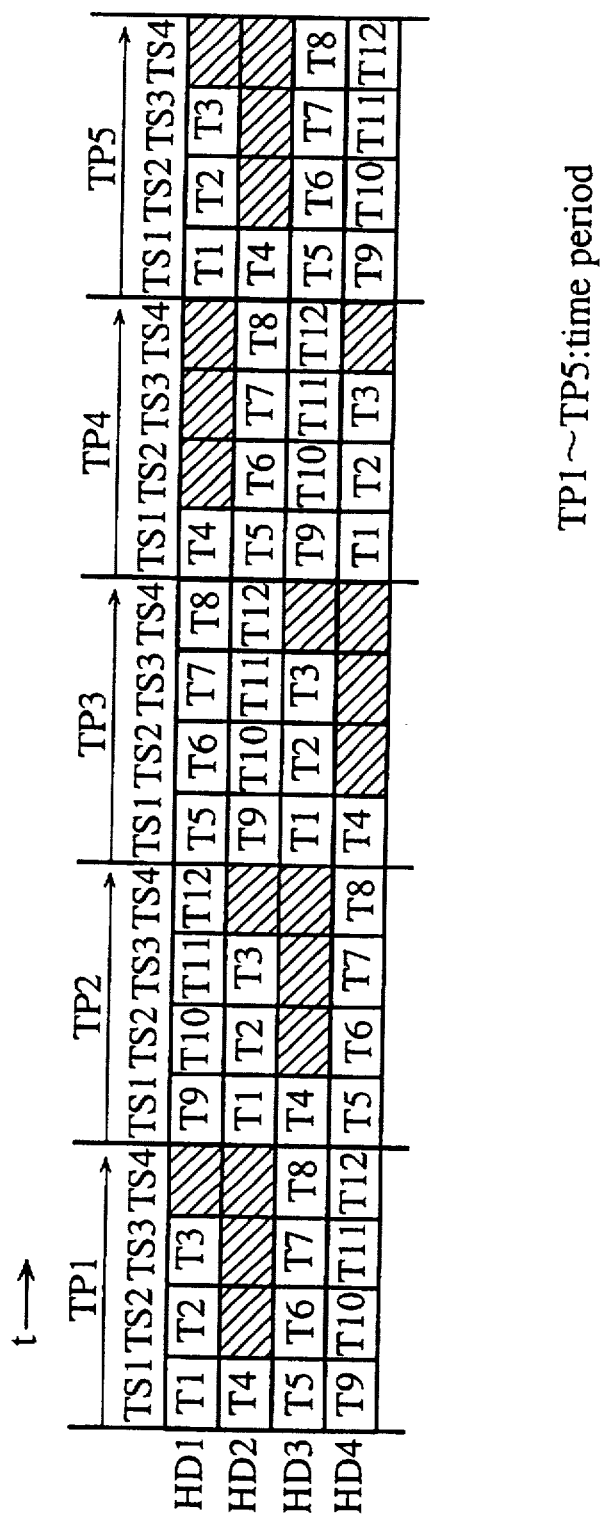
FIG. 7 shows the transition of the contents of the slot table from the time period TP1 to the time period TP4.

The slot table and its shifting are equal to those in the conventional system shown in FIGS. 6 and 7, respectively.

The image data processing unique to the present embodiment is as follows.

Figure 10:
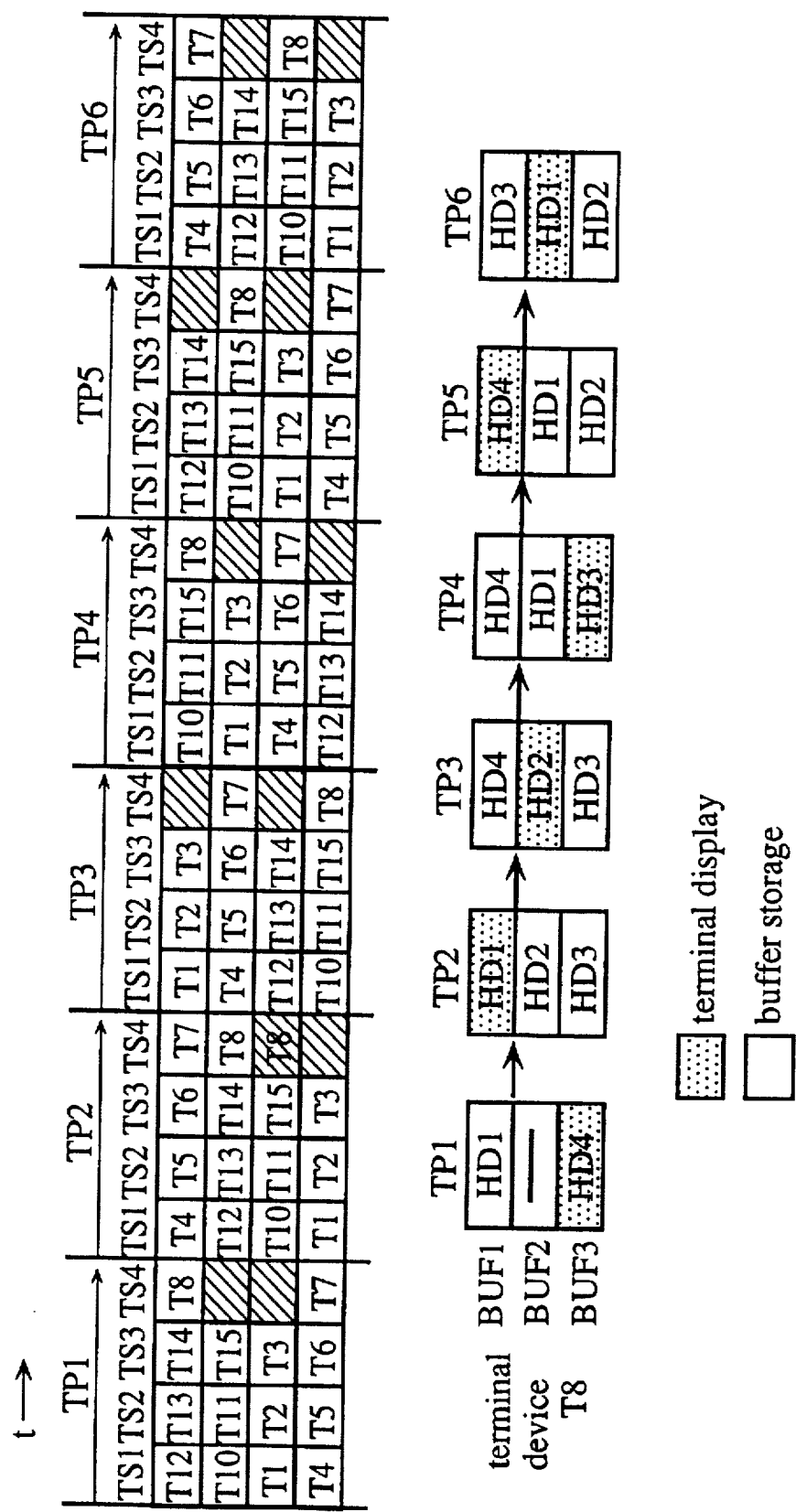
FIG. 10 shows the transition of the contents of the slot table and the contents of the buffer memory.
Figure 11:
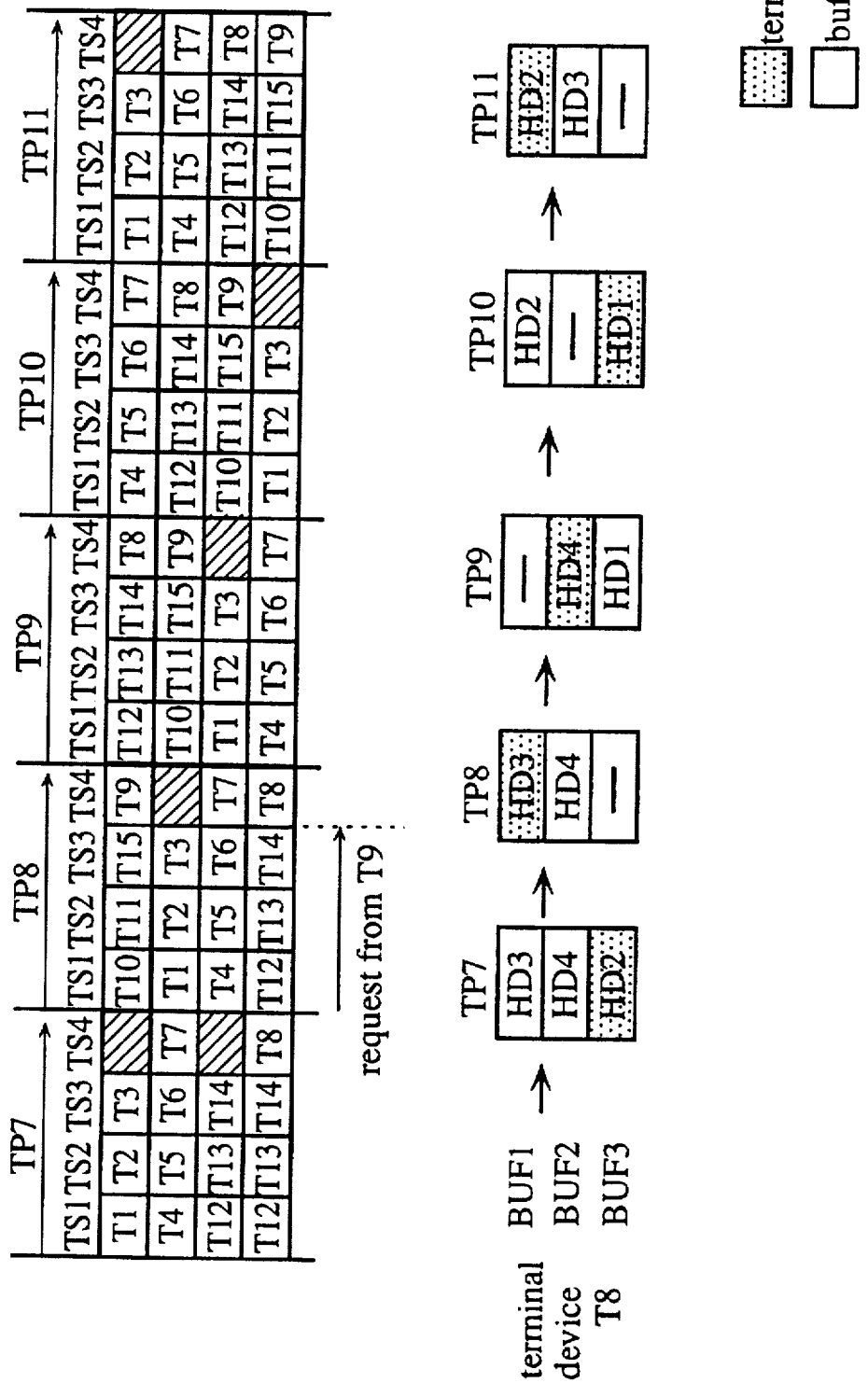
FIG. 11 shows the contents following FIG. 10.

FIGS. 10 and 11 respectively show the transition of the contents of the slot table held by the slot control unit 10 and the contents stored in the buffer memory. Both FIGS. 10 and 11 show a slot table at the top and the contents of the area BUF1–BUF3 in the buffer memory 308 connected with the terminal device T8 at the bottom. The dotted boxes in the BUF1–BUF3 indicate image data that are being reproduced and displayed in the terminal device T8 and the other boxes indicate image data that are stored therein.

In both FIGS. 10 and 11, each of the buffer memories 301–316 has three areas BUF1, BUF2, and BUF3.

At first, all the slots in the slot table are free. On receiving a distribution request signal, the terminal request reception unit 8 directs the terminal management unit 9 to address the request. According to the direction, the terminal management unit 9 outputs requested data to the slot control unit 10. The slot control unit 10 gives the data readout right to the terminal device that has made a distribution request. Then, the slot control unit 10 controls the storage device 1 and the data transmission device 2, based on the contents of the slot table, thereby supplying the terminal device with the image data via the buffer memories 301–316. As the result, desired images can be reproduced and displayed.

Along with the repetition of these procedures, blanks in the slot table are filled gradually to reach the state of the time period TP1 in FIG. 10, which has fewer free slots than FIG. 7. As shown in FIG. 10, the buffer memory 308 connected with the terminal device T8 assigned to the time slot TS4 is reproducing image data stored in the BUF3 which was read out from HD4. Image data read in the time period TP1 from HD1 is stored in the BUF1. On the other hand, the free slots in the time slot TS4 belong to HD2 and HD3, so that the maximum wait time for a terminal device which has received the readout right to read out desired image data from HD1 is 2 time periods.

In the time period TP2, the slot replace unit 11 detects that a free slot in the time slot TS4 is approaching the slot belonging to HD1, and directs the slot control unit 10 to change the contents of the slot control table.

Consequently, in addition to the image data stored in HD2, those stored in HD3 are read out by using a free slot belonging to HD3. The image data read from HD2 are stored in the BUF2, and those read out from HD3 are stored in the BUF3.

In the time period TP3, the image data stored in HD2 and HD3 are already transferred to the buffer memory 308 connected with the terminal device T8, so that the slot replace unit 11 directs the slot control unit 10 to change the contents of the slot table as follows.

The terminal device T8 which is supposed to be assigned to a slot belonging to HD3 is assigned to a slot belonging to HD4, to make the slot belonging to HD3 free. As a result, the free slots in the time slot TS4 belong to HD1 and HD3.

Such a slot exchange can reduce the maximum wait time for a terminal device which has been given the readout right to be assigned to the slot belonging to HD1 to one time period which is shorter than in the time period TP1.

Then, terminal devices are serially assigned the slots belonging to HD1–HD4 in the subsequent time periods TP4–TP7.

Suppose that in the time period TP8, the terminal device T9 has made a distribution request immediately before the time slot TS4, it is necessary to assign the terminal device T9 to a free slot belonging to HD1 in the time slot TS4. However, if the assignment starts at the time period TP7, the terminal device T8 is assigned to the slot belonging to HD1 so that it is impossible to give the readout right to the terminal device T9. To solve this problem, the slot replace unit 11 directs the slot control unit 10 to change the contents of the slot table so that the terminal device T8 is assigned to a slot belonging to HD4, which is the same slot in the time period TP7, thereby making the slot belonging to HD1 free. As a result the terminal device T9 is assigned the slot belonging to HD1.

At this moment, in the case of the buffer memory 308 connected with the terminal device T8, the image data read out from HD4 in the time period TP 7 and stored in the BUF2 is replaced with image data read out in the time period TP8 from HD4, and the image data of HD3 stored in the BUF1 is used for reproduction. However, the order of image data is not affected. Instead of such replacement, no data may be read in the time period TP8 to obtain the same results.

Hereinafter, the terminal devices are assigned to the slots belonging to HD1–HD4 in the subsequent time periods TP9–TP11.

Figure 12:
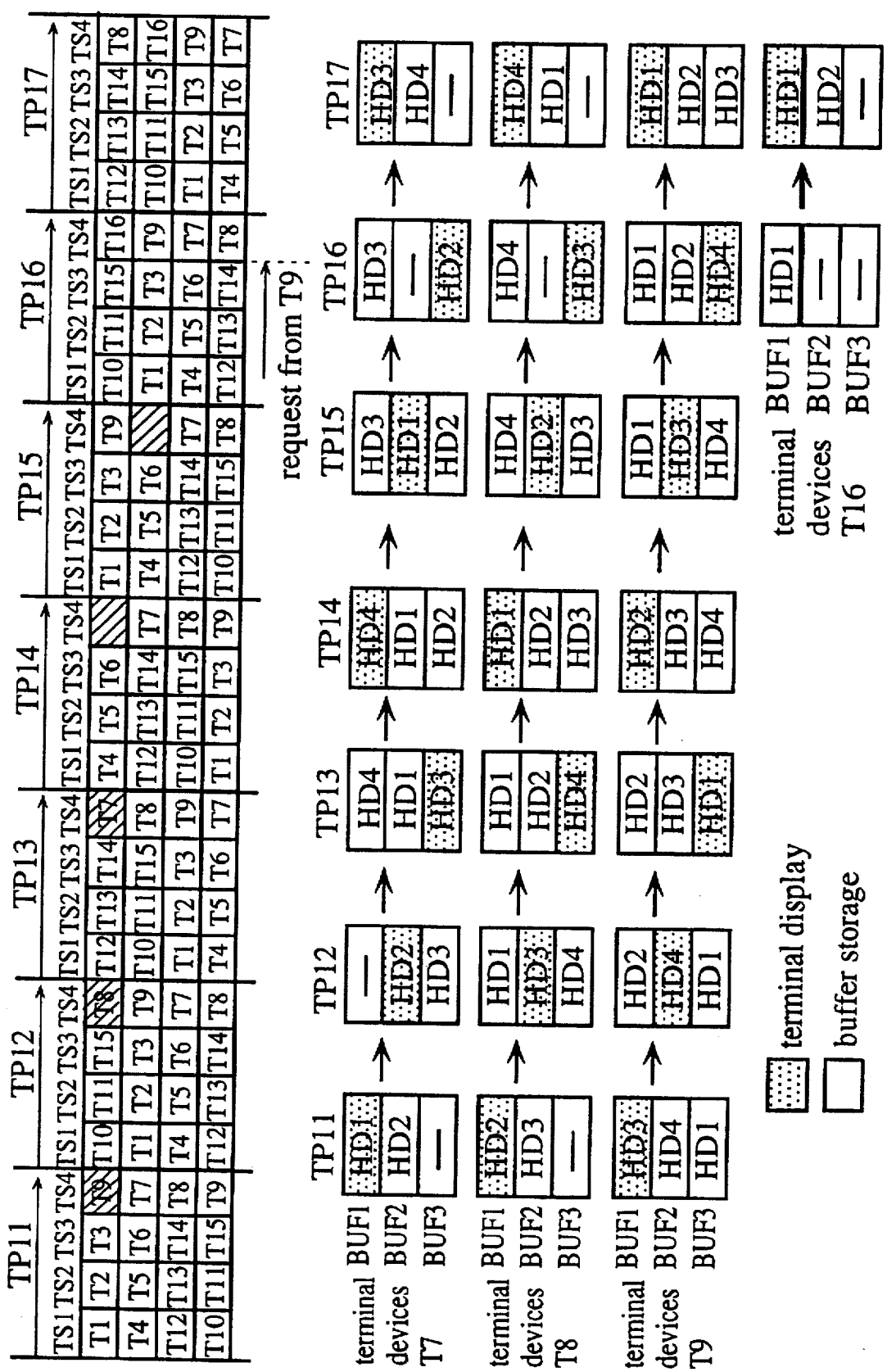
FIG. 12 shows the contents following FIG. 11.

FIG. 12 shows the case of the time periods TP12–TP17 as a continuation of FIG. 11. At the bottom of FIG. 12, the change of image data stored in the buffer memories 307–309 connected with the terminal devices T7–T9 is shown.

In the time period TP11, the slot belonging to HD1 in the time slot TS4 is supposed to be free; however, the slot replace unit 11 detects that no terminal device has been given the readout right and directs the slot control unit 10 to change the contents of the slot table and assigns the terminal device T9 to the free slot. The terminal device T9 in the shaded box indicates that the slot is originally free but the readout right is given to the terminal device T9. As a result, in the buffer memory 309 connected with the terminal device T9, image data of HD4 and HD1 are stored in addition to those of HD3 which are being reproduced in the time period TP11.

In the time period TP12, the slot replace unit 11 directs the slot control unit 10 to change the contents of the slot table, and assigns the terminal device T9 to the slot belonging to HD2 in the time slot TS4. As a result, the pre-read image data subsequent to the image data of HD1 are read out from HD2, and the slot belonging to HD1 in the time slot TS4 becomes free. Next, the terminal device T8 are assigned two slots to pre-read image data which is the case of HD1 and the time slot TS4.

In the same manner, in the time period TP13 the slot replace unit 11 directs the slot control unit 10 to exchange and pre-read the slots for the terminal devices T8 and T7 in HD1 and the time slot TS4.

In the time periods TP14 and TP15, the buffer memories 307–309 connected with the terminal devices T7–T9 assigned to the time slot TS4 do not have enough capacity to pre-read and to store more image data. Consequently, HD1–HD4 are used in the normal manner.

Suppose that the terminal device T16 has made a distribution request immediately before the time slot TS4, it is necessary to assign the terminal device T16 to the free slot belonging to HD1 in the time slot TS4. However, if the assignment starts at the time period TP15, the terminal device T8 is assigned to the slot belonging to HD1 so that it is impossible to give the readout right to the terminal device T8. To solve this problem the slot replace unit 11 directs the slot control unit 10 to change the contents of the slot table so that the terminal devices T7 and T8 are assigned to the same slot as in the time period TP 15, thereby making the slot belonging to HD1 free. As a result, the terminal device T16 is given the readout right.

At this moment, in the buffer memories 307 and 308 connected with the terminal devices T7 and T8, image data read out in the time period TP16 replaces the image data read out in the time period TP15. However, these data are identical so that there is no effects on the order of image data to be reproduced.

In and after the time period TP17, the terminal devices are serially assigned to the slots belonging to HD1–HD4.

Figure 13:
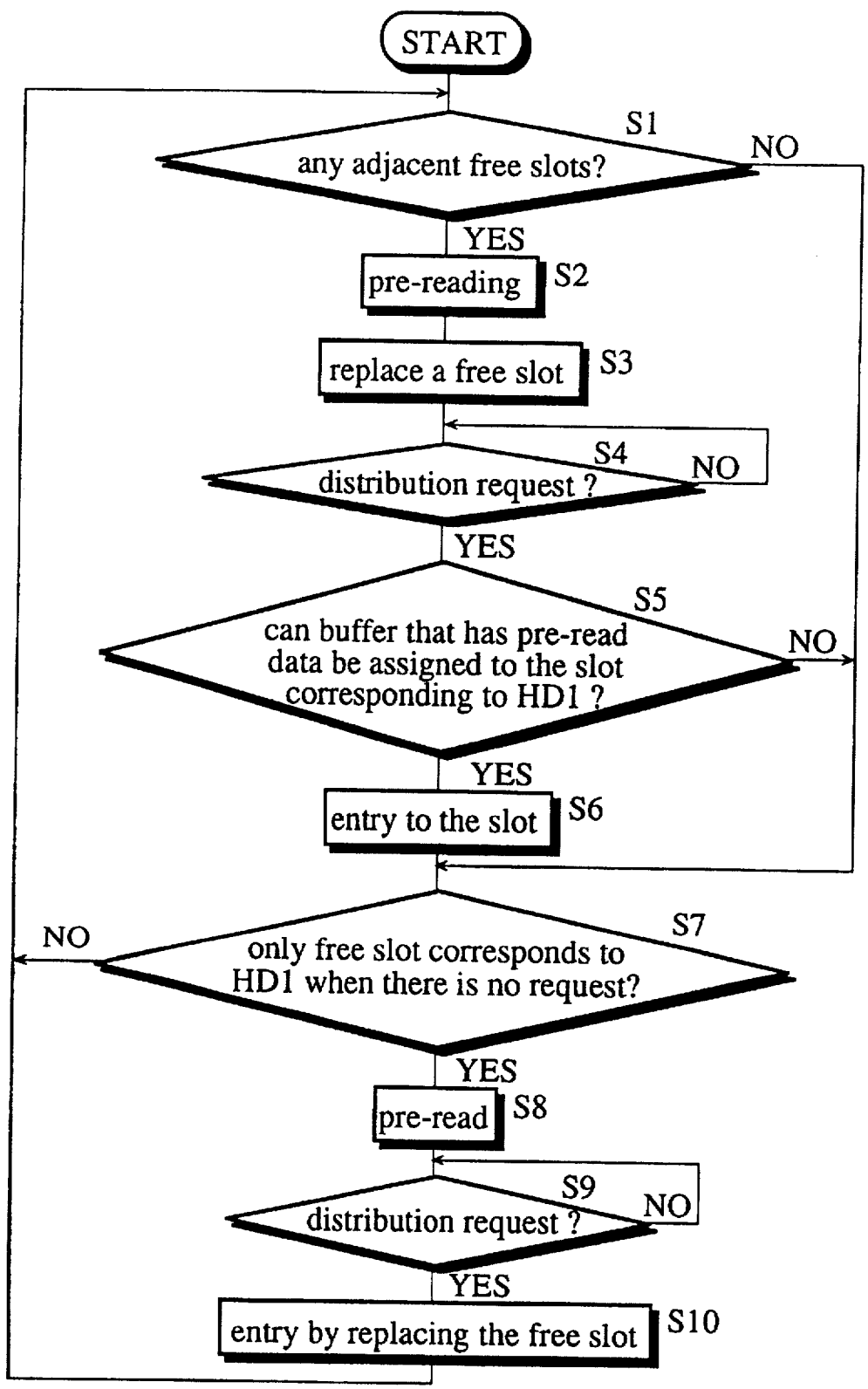
FIG. 13 shows the main operations of the slot replace unit 11.

The main operations of the slot replace unit 11 are shown in the flowchart of FIG. 13.

If there are two adjacent free time slots in the same time slot as shown in the time slot TS4 in the time period TP1 in FIG. 10 (step 1/YES), image data are pre-read by using these free slots like in the time slot TS4 in the time period TP2 (step 2), and the adjacent free slots are separated as shown in the time slot TS4 in the time period TP3 (step 3). The separation can reduce time for the free slots to address to HD1, which is the head hard disk, thereby reducing the wait time for a terminal device to be given the readout right.

When the terminal device T9 has made a distribution request as shown in the time period TP8 in FIG. 11 (step 4/YES), if the free slot belongs to HD1, the terminal device T9 is assigned to the free slot. Even if the free slot does not belong to HD1, when the slot belonging to HD1 is assigned to the terminal device T8 corresponding to the buffer memory 308 which has pre-read image data as in the time period TP8 (step 5/YES), the terminal device T9 is given the readout right and the image data of HD1 is supplied to the buffer memory 308, instead of the buffer memory 309 (step 6).

If there is one free slot in a time slot belonging to HD1 and there is no distribution request (step 7/YES), image data are pre-read to the buffer memories 307-309 as shown in FIG. 12 time period TP11-13 (step 8). Since a free slot belonging to HD1 is not used unless there is a distribution request, it is used for pre-reading image data so that the slot belonging to HD1 can be free when a distribution request signal is issued. In other words, for example the terminal device T16 makes a distribution request as shown in the time period TP16 in FIG. 12 (step 9/YES), the free slot, which is supposed to belong to HD3, is made to belong to HD1 by changing the position of the free slot, thereby giving the terminal device T16 the readout right (step 10). This causes no trouble because image data are pre-read to the buffer memories 307 and 308 connected with the terminal devices T7 and T8.

As described hereinbefore, when the terminal device which needs to read out head image data from HD1 is given the readout right, and there is no free slot, the time to wait for the slot can be reduced.

Furthermore, even when there is not free slot belonging to HD1, if there is only one free slot belonging to any one of HD2-HD4, a free slot can be available.

In the present embodiment, the storage device 1 is provided with only 4 hard disks to make the explanation easier, image data are transmitted to at most 16 terminal devices in a second. Needless to say, the number of terminal devices to receive image data in a second can be increased by increasing the number of readout operations per time period by improving the performance of the hard disks or the number of hard disks themselves.

In fact, the effects to decrease the wait time becomes obvious when the number of hard disks is around 50 or greater. It is preferable that distances between two free slots are as close to be equal to each other as possible.

The following is a description on the case where the numbers of hard disks and free slots are both large.

Figure 14A:
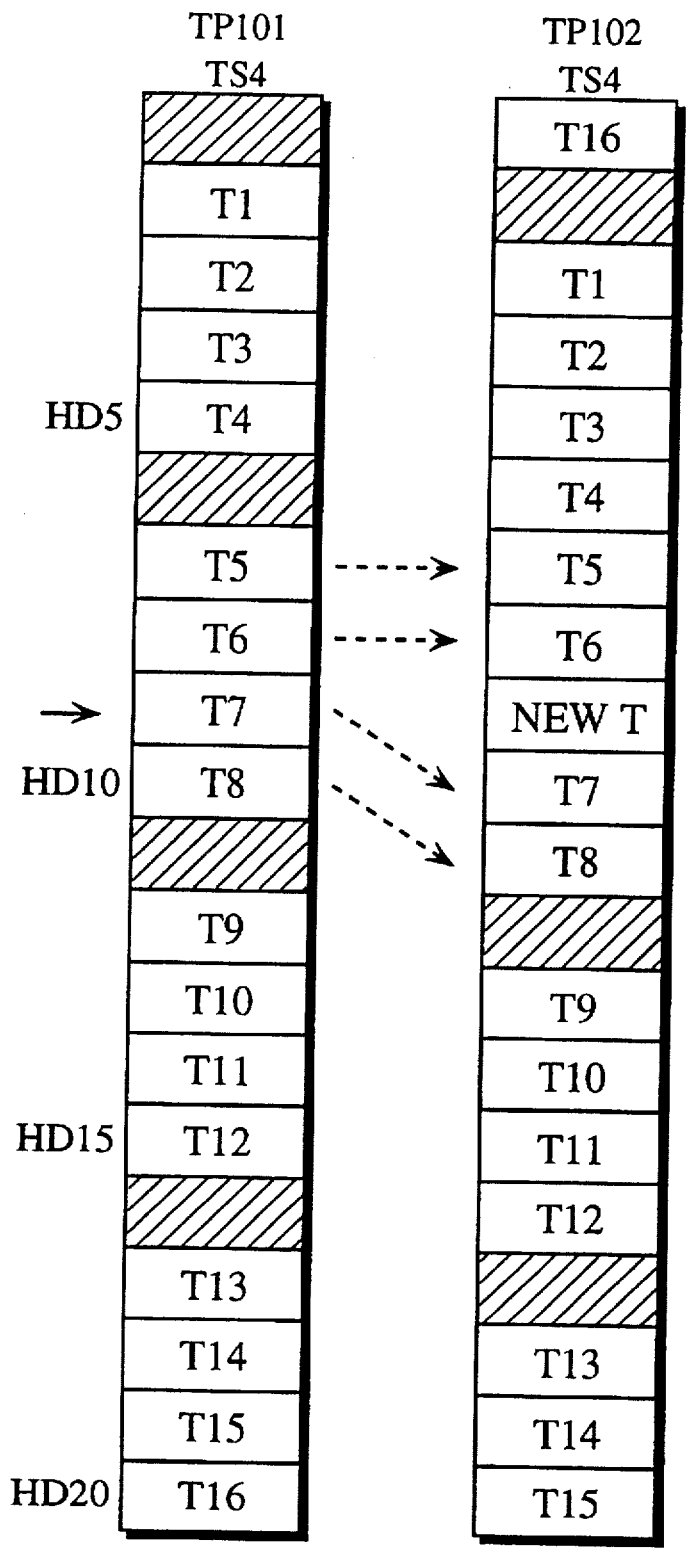
FIGS. 14A and 14B show the case where the number of hard disks and the number of free slots are both large.
Figure 14B:
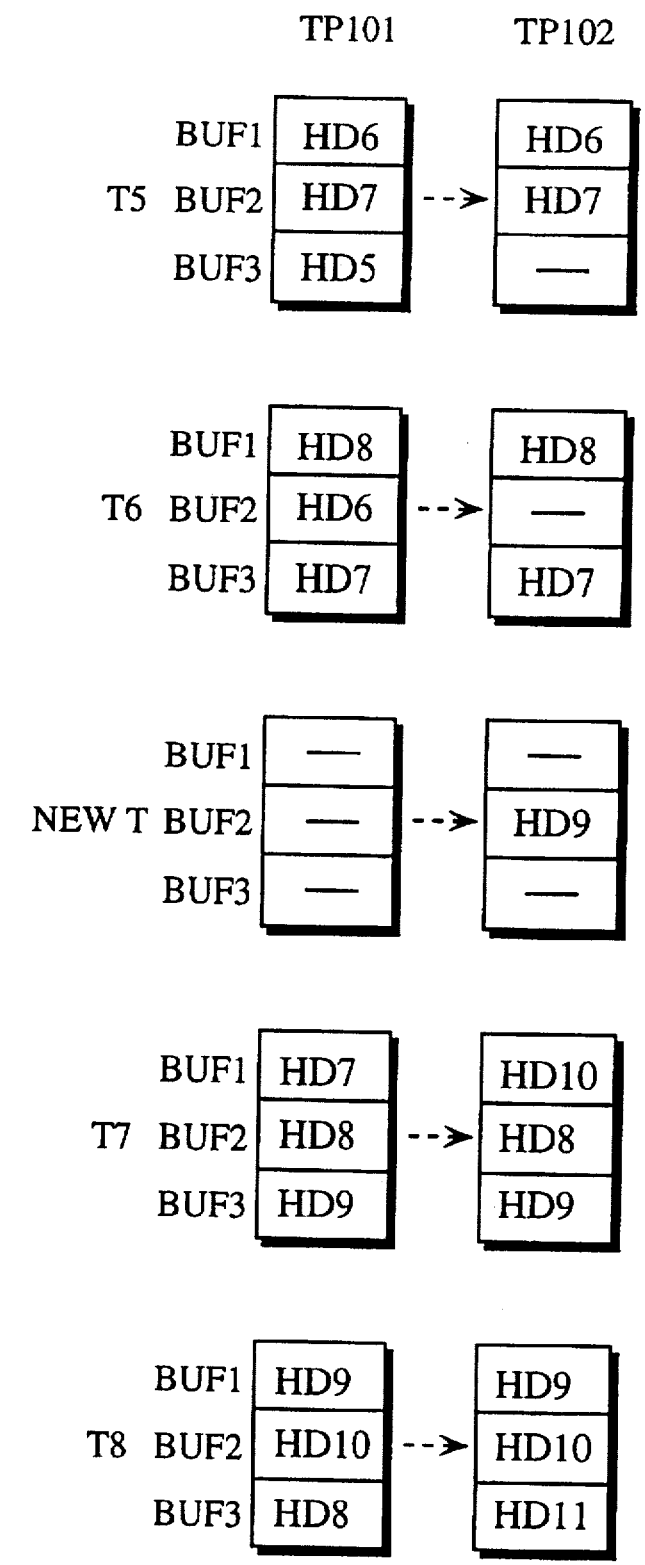

FIGS. 14A and 14B show the case where there are 20 hard disks. As shown in FIG. 14A, a free slot is provided after every 5 slots in the time slot TS4 in the time period TP101. Suppose that a terminal device NEW T has made a distribution request for a video program whose initial image data are stored in HD9 indicated with an arrow. Since the terminal devices T5 and T6 have pre-read image data, they read image data from the same position in the time period TP102.

The terminal device NEW T reads image data from HD9 in the time period TP102 by using the free slot, in the same manner as in the time slot TS4 in the time periods TP15-TP17. On the other hand, for the other terminal devices including terminal devices T7 and T8, the readout position is shifted by one as shown in the time slot TS4 in the time period TP102. FIG. 14B shows the change in the contents of image data stored in each storage area in the terminal devices T5-T8 and NEW T.

Then, if free slots are separated as shown in FIG. 14A, discontinuous image data can be read and transferred the terminal devices by using these free slots, and as a result, requests for high-speed rewinding reproduction and high-speed reproduction can be addressed.

Instead of sequentially using two of the three areas shown in FIG. 9, only two may be used as BUF1 and BUF2 as in the conventional system.

To the contrary, if there is any free slot, image data may be stored in the three areas by pre-reading them from the beginning by ignoring the one-second delay of transmission start.

The terminal devices and buffer memories, or the data transmission device and buffer memories may be connected by communication network.

The data may be compressed to one-fifth, or one-sixth of the original.

Since a free slot is generated in the previous time slot because of the completion of data transmission, a slot in a subsequent time slot may be moved forward.

Each buffer memory may have 4 or 5 storing areas instead of 3.

The storage device can be laser disks.

<EMBODIMENT 2>

Figure 15:
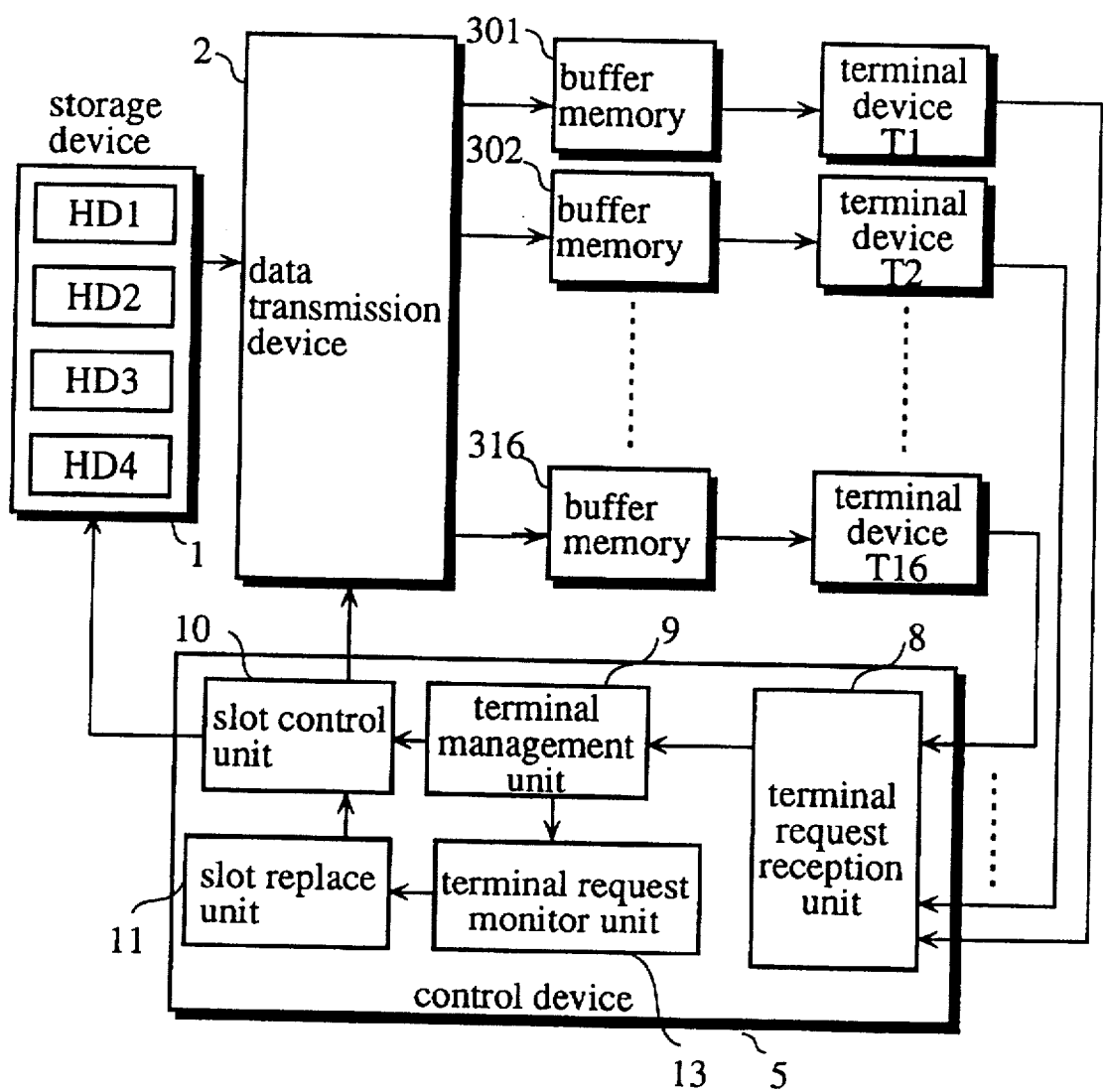
FIG. 15 shows the construction of the video-on-demand system according to the second embodiment of the present invention.

The construction of the video-on-demand system according to the second embodiment of the present invention is shown in FIG. 15. The second embodiment is different from the first embodiment in that a terminal request monitor unit 13 is additionally provided to the control device 5. However, the terminal request monitor unit 13 has no effects in the case where a normal reproduction request is made because the way of storing image data and the order of writing image data to buffer memories are all equal to those in the first embodiment.

The construction and operations unique to the present embodiment are explained as follows.

The terminal request monitor unit 13 receives distribution request signals from the terminal devices T1-T16 via the terminal control unit 9, and directs the slot replace unit 11 to change the position of slots on receiving a request for a special reproduction.

Figure 16:
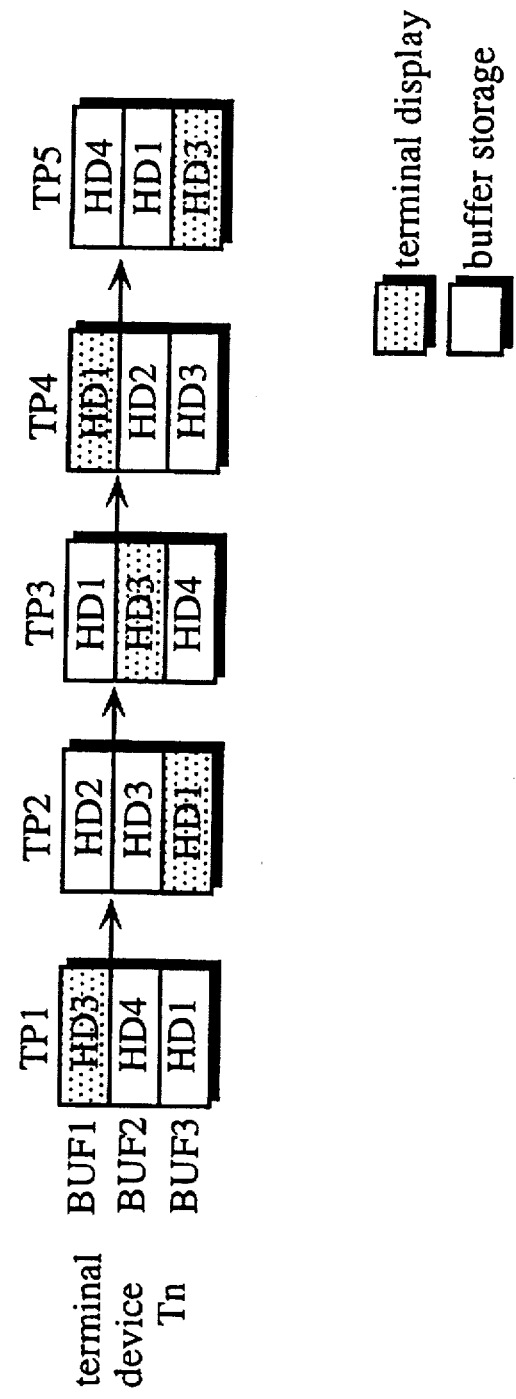
FIG. 16 shows storage areas where image data for the double-speed reproduction are stored.

If the terminal request reception unit 8 receives a distribution request signal from the terminal device T16 for requesting to reproduce original images at the double speed, the terminal request monitor unit 13 directs the slot replace unit 11 to pre-read image data by using a free slot. Consequently, the buffer memory 316 connected with the terminal device T16 receives two consecutive image data in addition to the image data which are currently being reproduced and displayed. Consequently, BUF1-BUF3 are always filled with image data. In this condition, the terminal device T16 displays every other divided image data stored in the buffer memory 316, which brings about double-speed reproduction. The slot position is changed so that the image data already read are not read out again. This is done by the direction given to the slot replace unit 11 from the terminal request monitor unit 13. The contents of the buffer memory 316 connected with the terminal device T16 are shown in FIG. 16. In FIG. 16, two areas other than those in process of reproduction of the buffer memory 316 are updated per time period, and the reproduction of the image data is carried out at every other area: in the order of BUF1, BUF3, BUF 2, and BUF1, thereby achieving the double speed reproduction. In this case, since one time period is a unit for image data compression, there are no effects on data extension and reproduction.

As explained hereinbefore, the present embodiment realizes double-speed reproduction by pre-reading image data to the buffer memories 301–316 and changing slot assignment.

Figure 17:
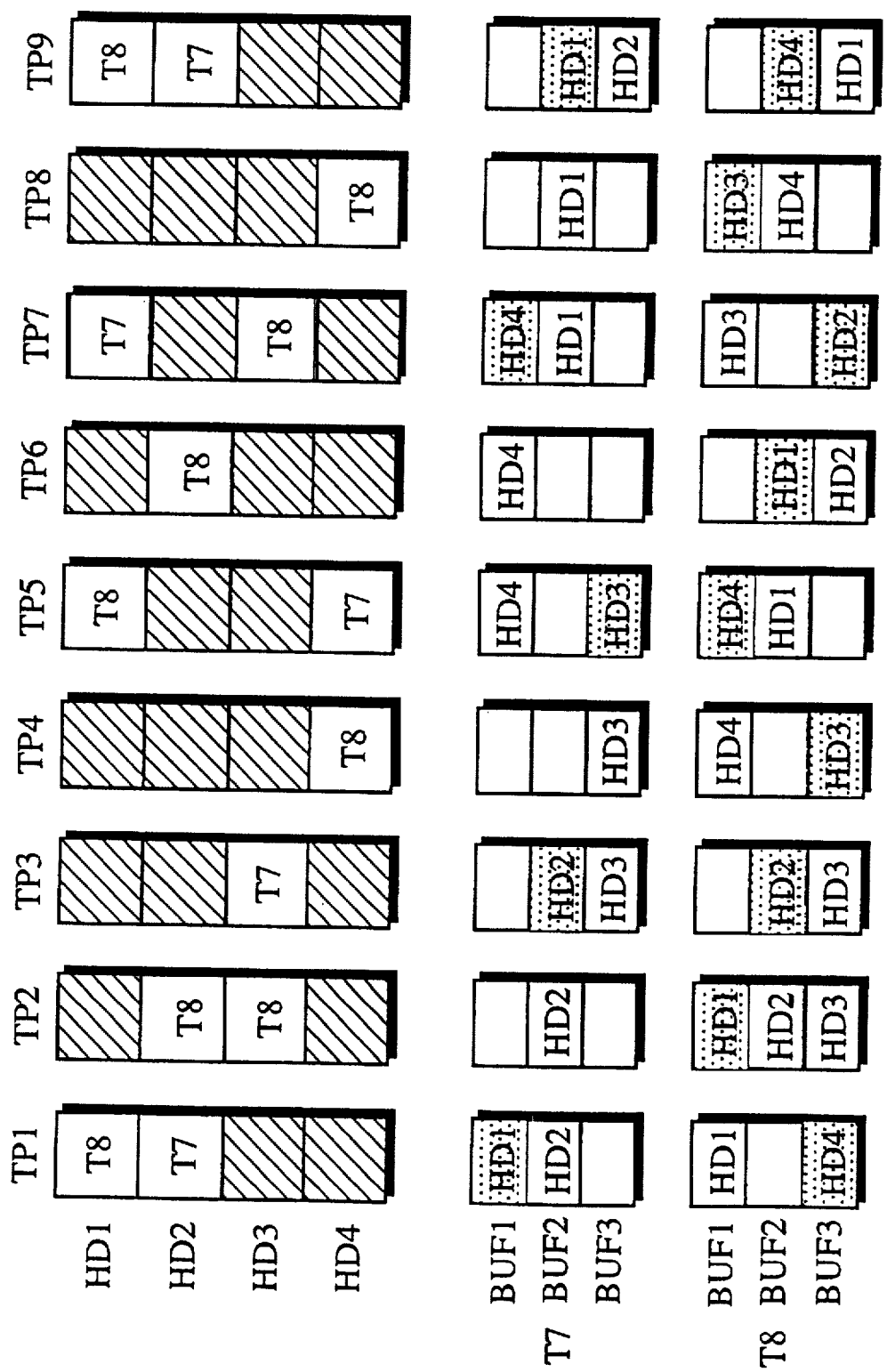
FIG. 17 shows the replacement of slots and the contents of each storage area in the buffer memories when a terminal device reproduces original images at a half speed.

Needless to say, higher-speed reproduction is possible by increasing the number of free slots. In addition, reproduction at a speed slower than the normal speed can be realized by replacing slots, thereby storing and reproducing the same image data. FIG. 17 shows the replacement of slots and the contents of each storage area in the buffer memories in the case where there are two free slots and a terminal device reproduces original images at a half-speed and the other terminal devices reproduces at the normal speed.

Furthermore, if the number of the storage areas is increased to 4 or 5, other various types of reproduction can be realized if only one free slot is available.

<EMBODIMENT 3>

Figure 18:
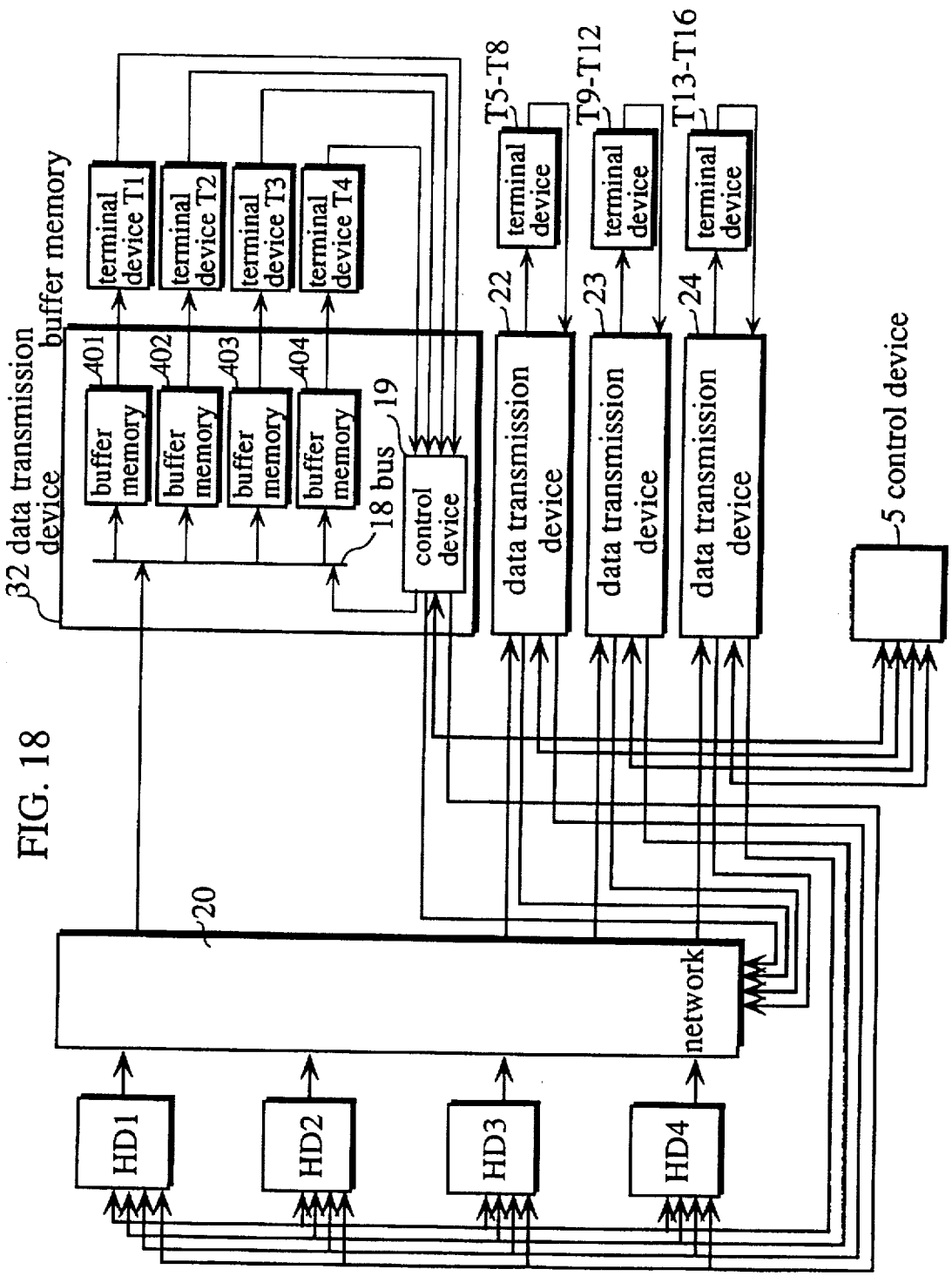
FIG. 18 shows the construction of the video-on-demand system according to the third embodiment of the present invention.

The construction of the video-on-demand system according to the third embodiment of the present invention is shown in FIG. 18.

The video-on-demand system is provided with a storage device 1, a network 20, data transmission devices 21–24, terminal devices T1–T16, and a control device 5.

The storage device 1 is composed of HD1–HD4, which store image data divided and compressed in the same manner as the first embodiment.

Each of the data transmission devices 21–24 is provided with 4 buffer memories, a bus 18, and a control unit 19.

Each of the buffer memories 401–416 are connected with a respective one of the terminal devices T1–T16.

The buffer memories 401–416 temporarily store image data sent from HD1–HD4 via the network 20 to divide them into smaller image data, thereby transferring them to the terminal devices T1–T16. For this purpose, each buffer memory has two storage areas: BUF1 and BUF2, and when one of them is used to transmit image data to the corresponding terminal device, the other is used to read image data from a hard disk.

Each bus 18 distributes image data received from HD1–HD4 via the network 20 to the respective buffer memories in each data transmission device.

Each control unit 19 refers to the control table stored in the control device 5 at the request of the respective terminal device, thereby controlling the HD1–HD4, the network 20, and the corresponding bus 18. As will be explained later, the control table controls the entire system and has the same function as the time slot table in the first and second embodiments.

The control device 5 stores the control table which shows the conditions that the network 20 and the HD1–HD4 are used.

Figure 19:
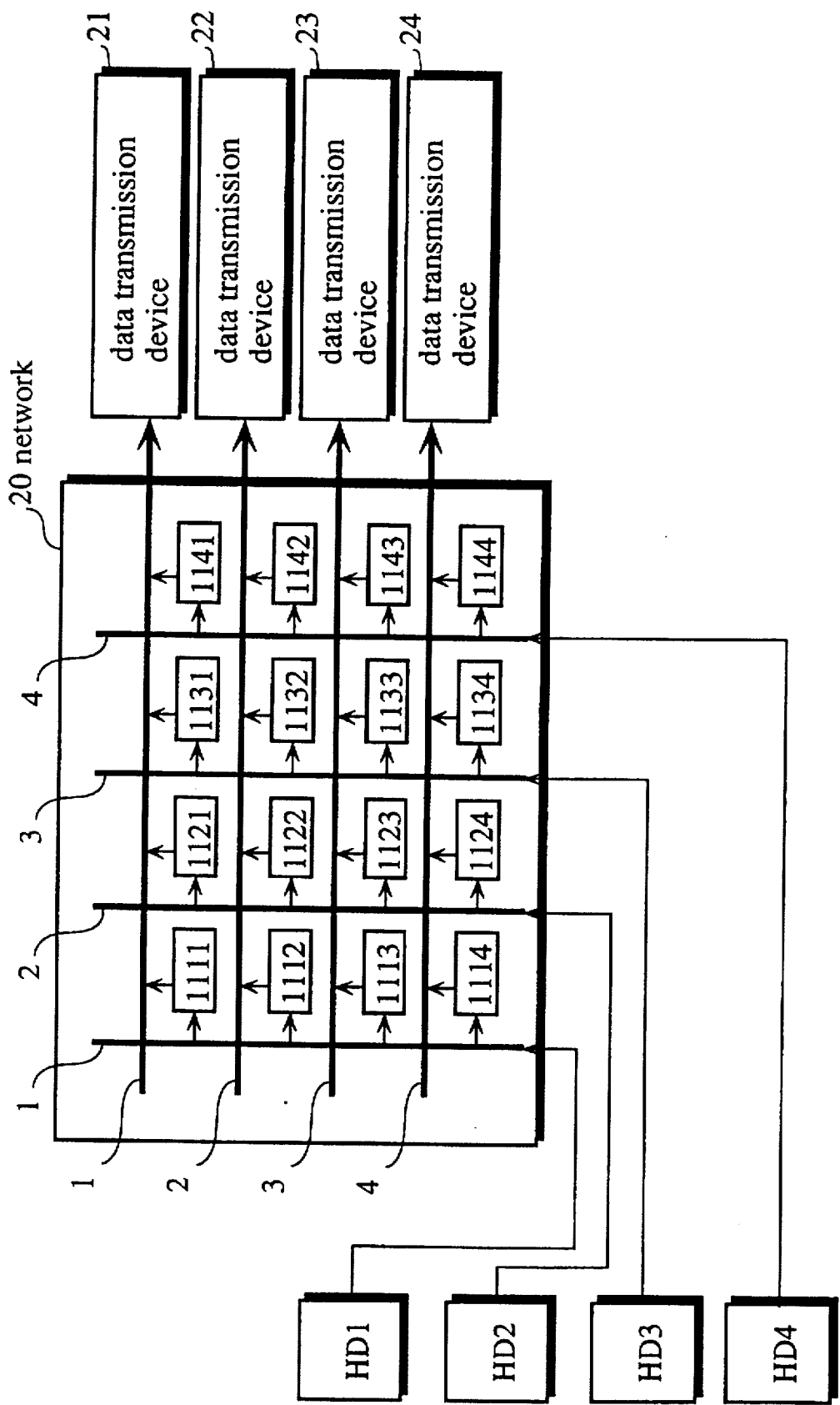
FIG. 19 shows the construction of the network 20 provided in the third embodiment.

FIG. 19 shows the construction of the network 20 which is provided with FIFO memories 1111–1144 composed of 4×4 crossbar network. The high-speed semi-conductor FIFO memories 1111–1144 temporarily store image data received from HD1–HD4 via four vertical input buses, and output image data to the data transmission devices 21–24 via four horizontal output buses. Thus, four outputs can be obtained from four inputs at the same time by properly designating input and output.

Figure 20:
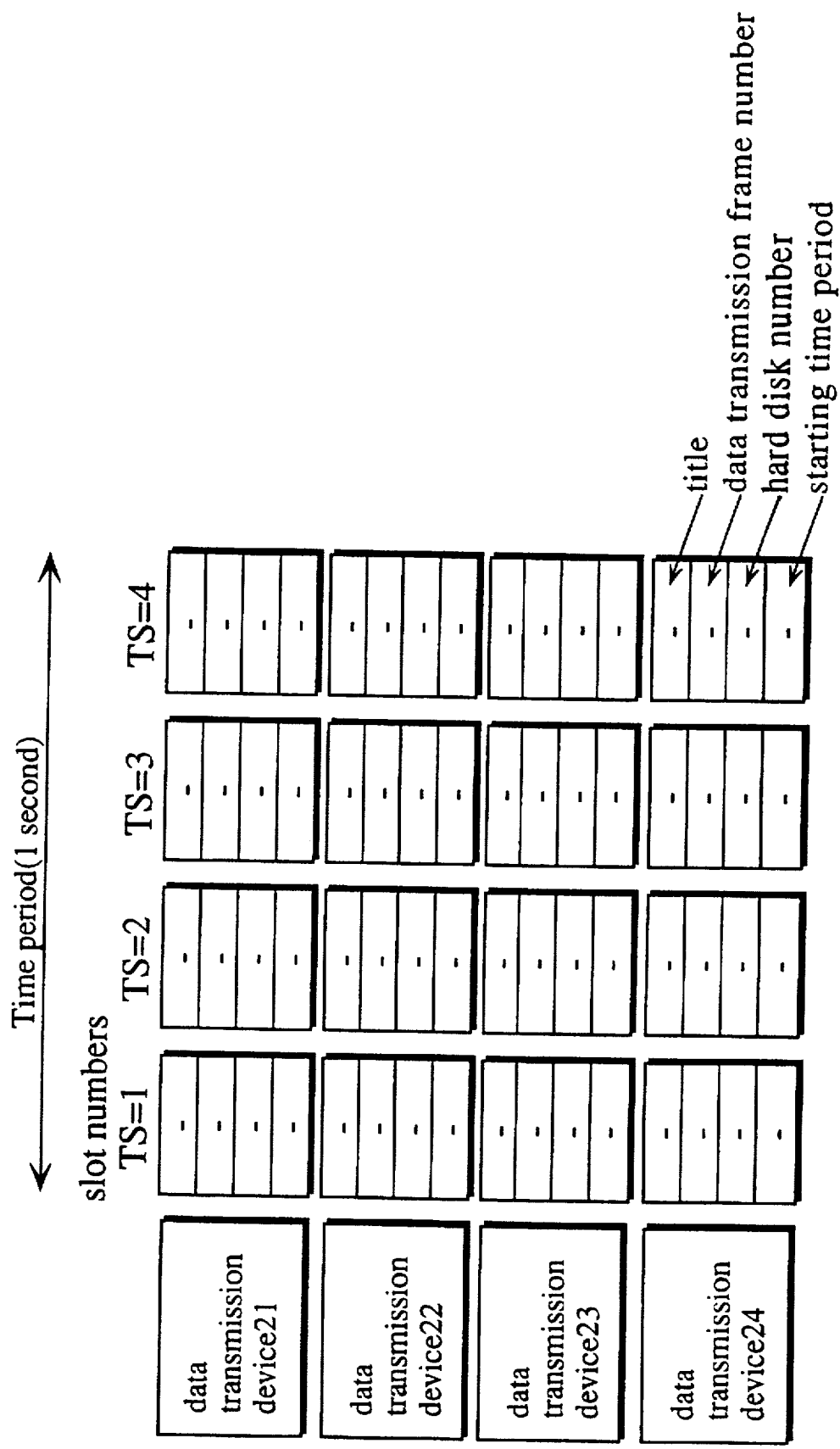
FIG. 20 shows the control table stored in the control device 5 of the third embodiment.

FIG. 20 shows the control table stored in the control device 5. The control table has the following columns.
(1) the title of video programs to be distributed to the data transmission devices and further to the terminal devices connected with the data transmission devices.
(2) the frame numbers of the video programs to be transferred in the current time period.
(3) the number of hard disks which store image data corresponding to the frame numbers
(4) the time period numbers in which image data corresponding to the first frame number are started to be read.

These columns are updated in every time period because they are changed as a result of image data transmission.

The control table further controls the timing of transferring image data from HD1–HD4 to the network 20 and from the network 20 to the data transmission devices 21–24, because the same FIFO memory cannot input and output image data at the same time.

In the video-on-demand system of the present embodiment, the maximum number of terminal devices is 16. The speed at which image data are read from HD1–HD4 is 4 frames per second. The original images corresponding to image data for one frame are extended into those for four frames and displayed by the terminal devices T1–T16. The time required for reading image data for one frame from HD1–HD4 and transferring them to the network 20 corresponds to one time slot. Since each bus of the network 20 can transfer image data at the speed of 4 frame per second, the entire network 20 has a data transmission performance of 16 frames per second. The data transmission device 21 outputs image data to the terminal device T1 in the time slot TS1, to the terminal device T2 in the time slot TS2, to the terminal device T3 in the time slot TS3, and to the terminal device T4 in the time slot TS4. The other data transmission devices output image data to the respective terminal devices in each time slot.

This video-on-demand system operates as follows.

First of all, a subscriber at the terminal device T1 makes a request for a video program a1. In the time period TP1, the control unit 19 of the data transmission device 21 refers to the control table stored in the control device 5 to check the conditions of the HD1–HD4 and the network 20. Knowing that no other subscribers use them as shown in FIG. 21(a), the control unit 19 puts "2" as a readout starting frame number in the control table, thereby requesting to start to read the image data at the time period TP2.

In the time period TP2, as shown in FIG. 21(b), "1" is put as the readout frame number for the video program a1 and also as the hard disk number which store the initial frame. In this case, the image data corresponding to the frame number 1 of the video program a1 are read from HD1 by the control unit 19 of the data transmission device 21, and written in the first area of the buffer memory 401 of the data transmission device 21 via the vertical line 1, the FIFO memory 1111, and the horizontal line 1.

As shown in FIG. 21(c), in the time period TP3, the control unit 19 of the data transmission device 21 reads image data corresponding to the frame number 2 of the video program out of HD2. The image data are written in the second area of the buffer memory 401 of the data transmission unit 21 via the vertical line 2, the buffer memory 1121, and the horizontal line 1.

At the same time, the image data corresponding to the frame number 1 stored in the first area of the buffer memory 401 which was written in the time period TP2 are transferred to the terminal device T1.

In the time period TP4 shown in FIG. 21(d), the image data of the frame number 3 which has been read out from HD3 by the control unit 19 of the data transmission device 21 are written to the first area of the buffer memory 401 via the vertical bus 3, FIFO memory 1131, and horizontal bus 1 of the network 20. At the same time, the image data corresponding to the frame number 2 stored in the second area of the buffer memory 401 which was written in the time period TP3 are sent to the terminal device T1.

In the time period TP5 shown in FIG. 21(e), the image data corresponding to the frame number 3 which has been read out from HD4 by the control unit 19 of the data transmission device 21 are written to the second area of the buffer memory 401 via the vertical bus 4, FIFO memory 1141, and horizontal bus 1 of the network 20.

At the same time, the image data corresponding to the frame number 2 stored in the first area of the buffer memory 401 which was written in the time period TP4 are sent to the terminal device T1.

These operations are repeated for image data corresponding to the subsequent frame numbers, and serial image data are transferred to the terminal device T1 as shown in FIG. 21(f)–(j).

Suppose that the terminal device T5 has made a distribution request for the video program a2 in the time period TP13, while the image data for the video program a1 are being reproduced at the terminal device T1. As shown in FIG. 22(c), the control unit 19 of the data transmission device 22 refers to the control table held in the control device 5 and determines that the network 20 cannot be used because the control unit 19 of the data transmission device 21 reads out image data from HD1 in the next time period TP14. As a result, the control unit 19 writes to the control table that the readout of the image data for the video program a2 is started at the time period TP15.

In the time period TP14, only the image data for the video program a1 are stored in the network 20 or transferred to the data transmission device.

In the time period TP15, as shown in FIG. 22(e), the vertical bus 1 of the network 20 is assigned to the terminal device T5. This makes it possible to transfer the initial image data for the video program a2 from HD1 to the unillustrated buffer memory 405 of the data transmission device 22 in the same manner as in the time period TP2. Hereinafter, the same operations as in the time period TP3 are carried out. In other words, the data transmission devices 21 and 22 simultaneously read out image data from a different one of HD1–HD4 from each other, thereby transferring image data serially to the terminal device T1 and T5 which use the same time slot TS1.

In the time period 20, suppose that the terminal device T9 has made a distribution request for the video program a3 as shown in FIG. 23(a), the control unit 19 of the data transmission device 22 refers to the control table stored in the control device 5, determines that the readout of the image data for the video program a3 is started at the next time period TP21, and writes it to the control table.

In the time period 21, as shown in FIG. 23(b), the vertical bus 1 of the network 20 is assigned to the terminal device T9. This makes it possible to transfer the initial image data for the video program a3 from HD1 to the unillustrated buffer memory 409 of the data transmission device 23 in the same manner as in the time period TP2. Hereinafter, the same operations as in the time period 3 are carried out. In other words, the data transmission devices 21, 22, and 23 simultaneously read out image data from a different one of HD1–HD4 from each other, thereby transferring image data serially to the terminal device T1, T5, and T9 which use the same time slot TS1.

In the time period 23, suppose that the terminal device T13 has made a distribution request for the video program a4 as shown in FIG. 23(d), the control unit 19 of the data transmission device 24 refers to the control table stored in the control device 5, determines that the readout of the image data for the video program a4 is started at the next time period TP24, and writes it to the control table.

In the time period TP24, as shown in FIG. 23(e), the vertical bus 1 of the network 20 is assigned to the terminal device T13. This makes it possible to transfer the initial image data for the video program a4 from HD1 to the unillustrated buffer memory 413 of the data transmission device 24 in the same manner as in the time period TP2. Hereinafter, the same operations as in the time period 3 are carried out. In other words, the data transmission devices 21–24 simultaneously read out image data from a different one of HD1–HD4 from each other, thereby transferring image data serially to the terminal device T1, T5, T9, and T13 which use the same time slot TS1.

Figure 24:
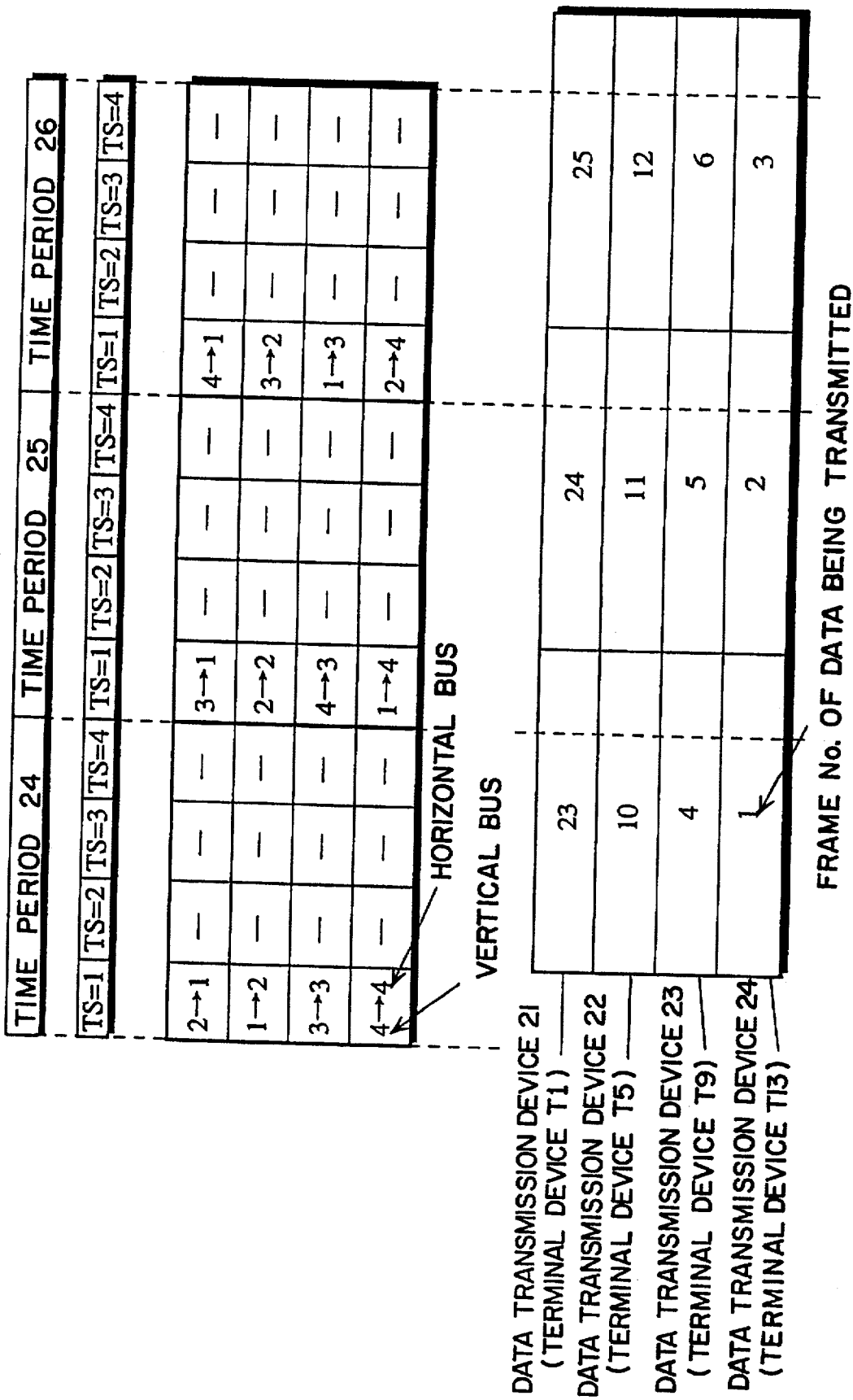
FIG. 24 shows the operations of the first slot of the third embodiment.

In the time period TP24, as shown in FIG. 24, image data are transferred separately from HD2 to the data transmission device 21, from HD1 to the data transmission device 22, from HD3 to the data transmission device 23, and from HD4 to the data transmission device 24.

In the time period TP25, image data are transferred in the time slot TS1 separately from HD3 to the data transmission device 21, from HD2 to the data transmission device 22, from HD4 to the data transmission device 23, and from HD1 to the data transmission device 24. Thus, the timing of image data readout from HD1–HD4 and image data output from the network 20 is controlled by using the control table stored in the control device 5. As a result, image data can be distributed to a large number of subscribers by making the best use of the buses in the network 20.

Although only the first time slot TS1 has been used so far in the explanation, the subsequent time slots TS2, TS3, TS4 are assigned in response to more distribution requests. When each terminal device is assigned to a slot, the image data readout from HD1–HD4 and the image data output from the network 20 to the data transmission device 21–24 are scheduled not to cause collisions between them.

Figure 25:
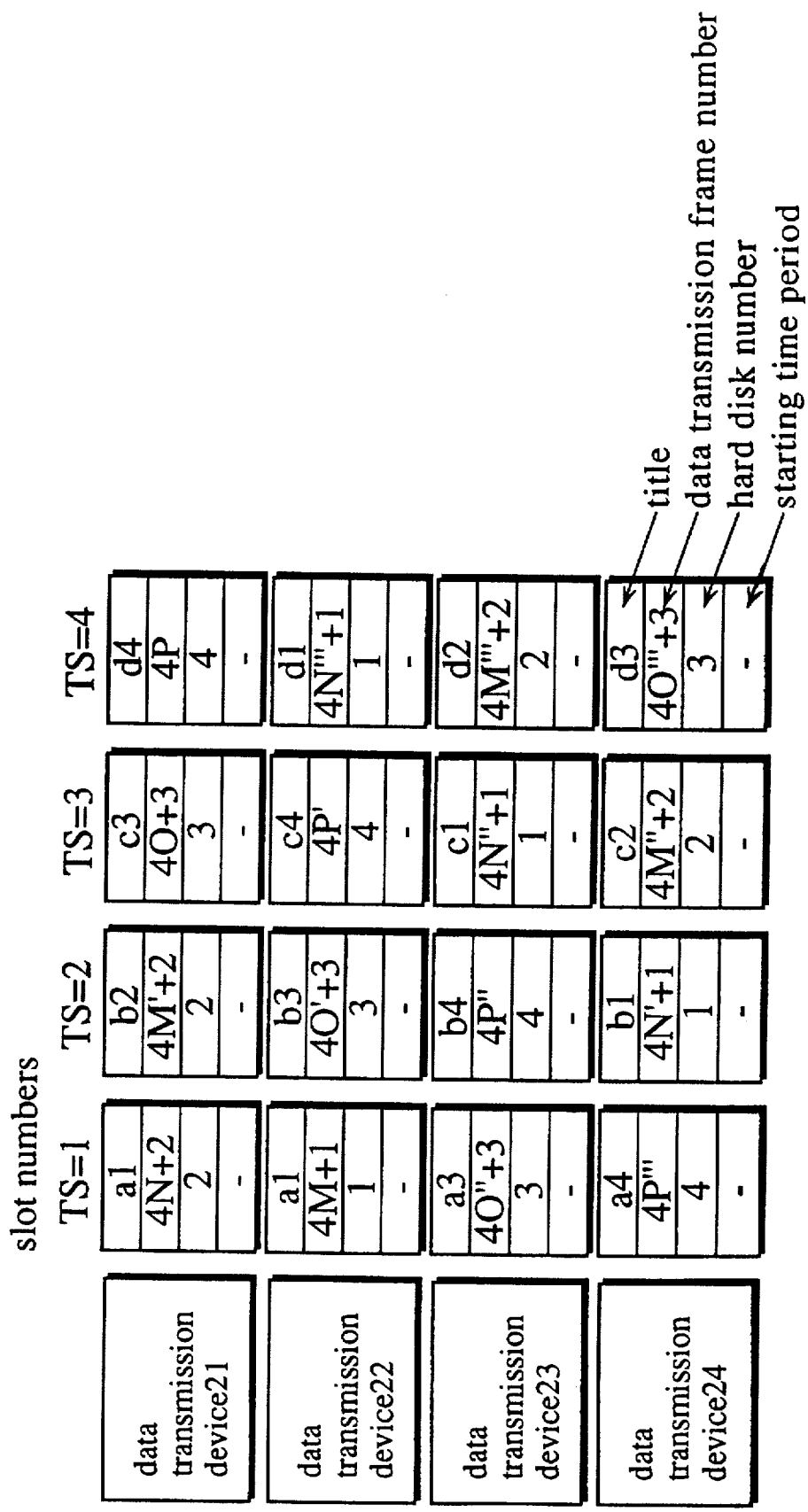
FIG. 25 shows the transition the contents of the control table in the time period K.
Figure 27:
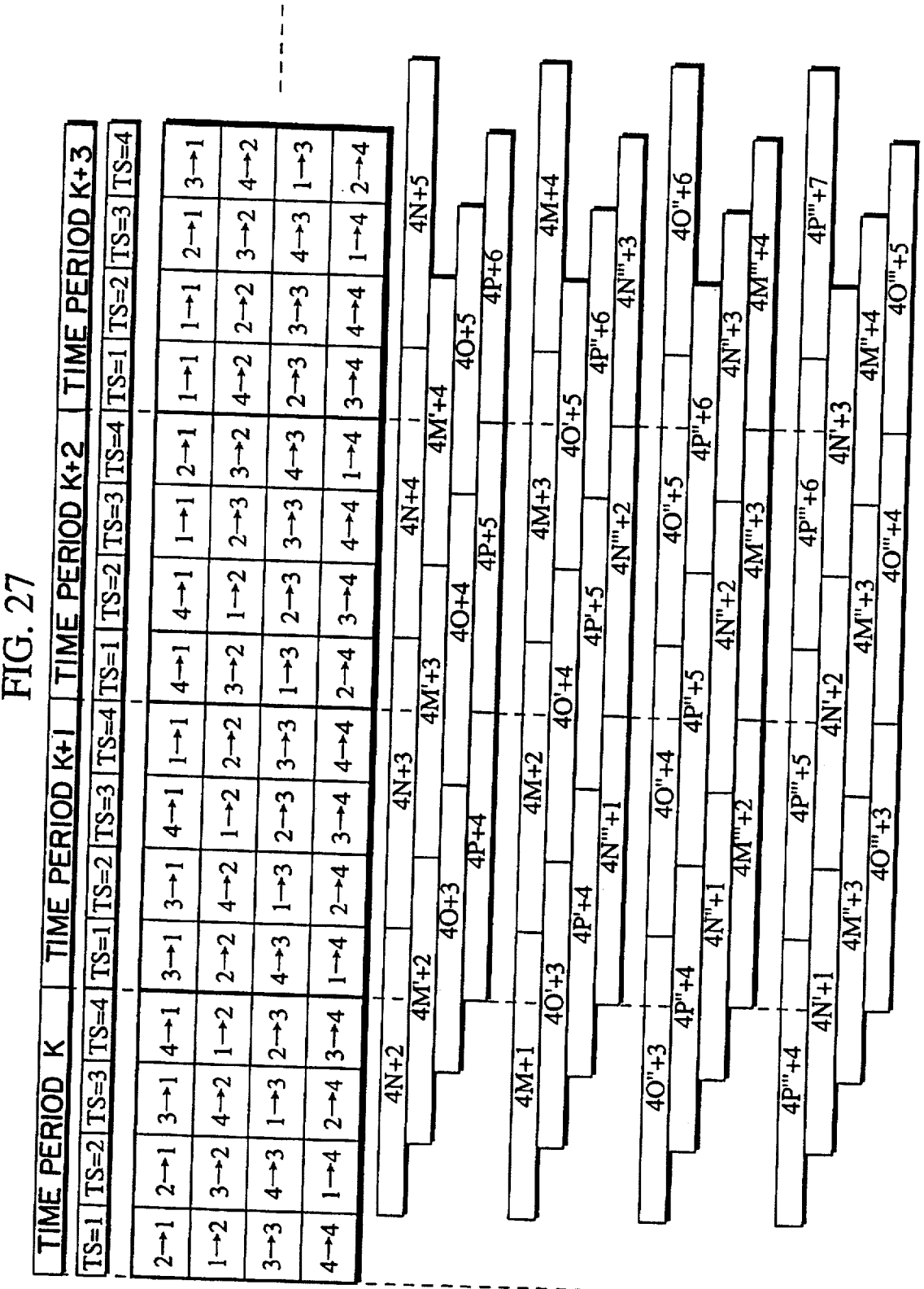
FIG. 27 shows each slot in four time periods in the third embodiment.

For example, if the contents of the control table in the time period K are as shown in FIG. 25, then the contents of the control table in the time period K+1 are as shown in FIG. 26 where the number of the hard disks from which to read image data and the number of frames of image data to be outputted are incremented by one. FIG. 27 shows readout of image data from HD1–HD4 in the time periods K, K+1, K+2, and K+3, the buses in the network 20, and data output of the terminal devices T1–T16.

As explained hereinbefore, collision between data to be sent from HD1–HD4 and those to be outputted from the network 20 is avoided by using the control table stored in the control device 5. Thus, the network 20 allows video data which are stored in HD1–HD4 to be transmitted to the data transmission device 21–24 at the same time. Consequently, a large amount of video data can be transmitted to the terminal devices T1–T16.

In the present embodiment, image data can be distributed to more terminal devices by increasing the numbers of hard disks and data transmission devices, and designing the network 20 to accommodate the numbers. In this case, the number of hard disks and the number of data transmission devices are not necessarily equal.

<EMBODIMENT 4>

Figure 28:
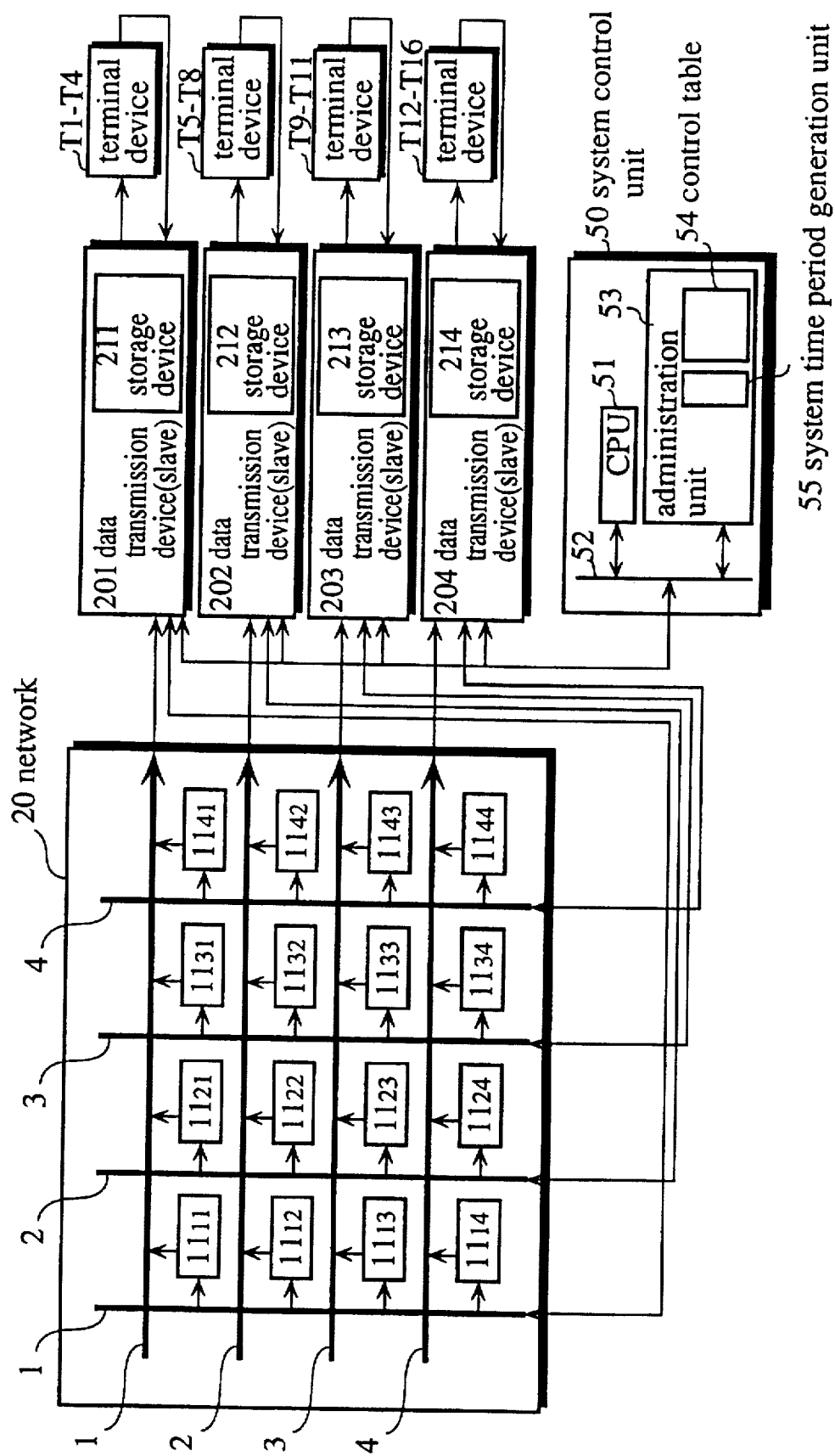
FIG. 28 shows the construction of the video-on-demand system according to the fourth embodiment of the present invention.

The construction of the video-on-demand system according to the fourth embodiment of the present invention is shown in FIG. 28.

The video-on-demand system of the present embodiment employs a master-slave type parallel processor, so that each of HD1–HD4 and buffer memories are included as storage devices 211–214 in a respective one of the data transmission device 201–204.

The host computer, which is the master, is composed of a system control unit 50 which controls the entire video-on-demand system. The system control unit 50 is provided with the CPU51, the bus 52, and the administration unit 53. The administration unit 53 holds the control table 54 and the system time period generation unit 55 for synchronization.

Figure 29:
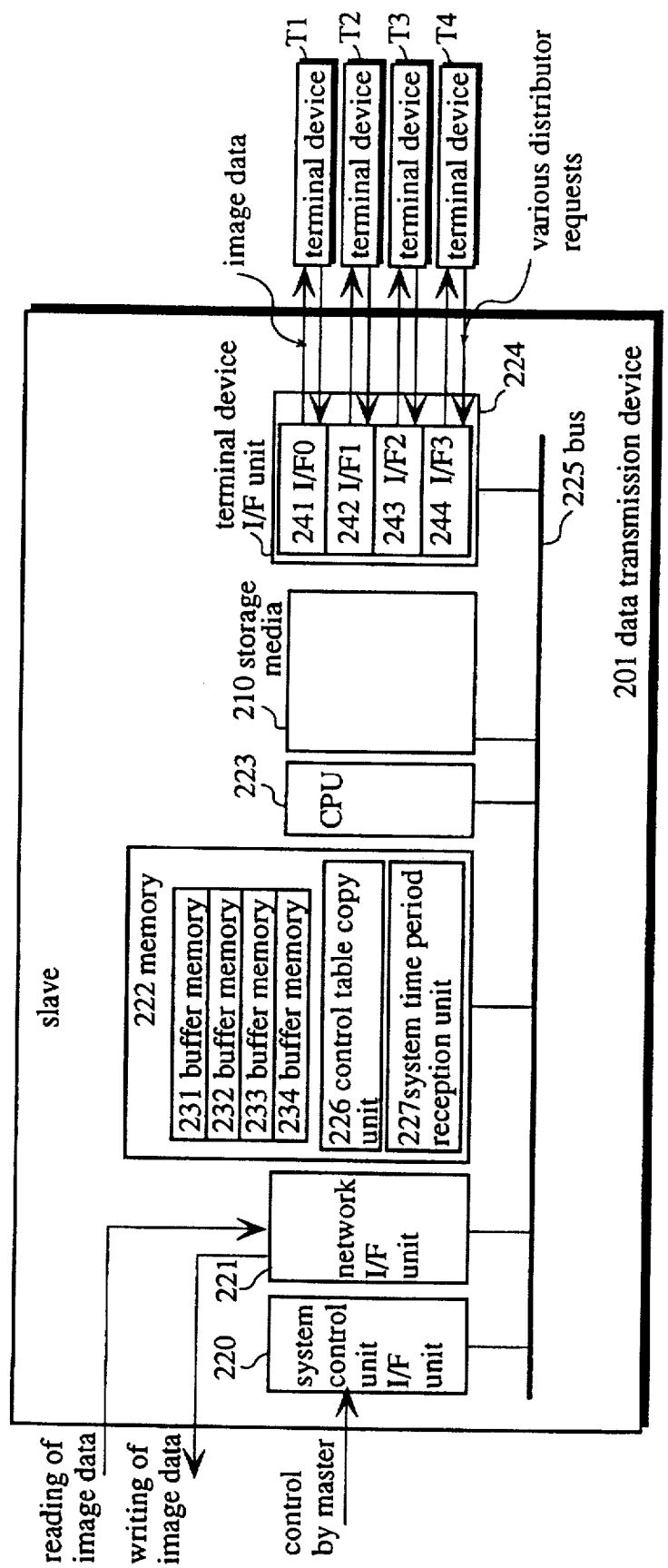
FIG. 29 shows the construction of the data transmission device 21 of the forth embodiment.

FIG. 29 shows the construction of the data transmission device 201, which is provided with a storage device 210, the system control unit I/F unit 220, the network I/F unit 221, the memory 222, the CPU 223, the terminal device I/F unit 224 having terminal device I/F units 241–244, and the bus 225. The memory 222 includes the buffer memories 231–234, the control table copy unit 226, and the system time period reception unit 227 for synchronization.

The storage device 210 is provided with hard disks for storing image data therein and readout units for reading image data from the hard disks, the image data having been divided in the same manner as the forgoing embodiments.

The system control unit I/F unit 220 send/receive data to/from the system control unit 50.

The network I/F unit 221 performs data transmission in the network 20.

The terminal device I/F unit 224 transmits data to the terminal devices T1–T4.

The memory 222 includes buffer memories 231–234, to which image data sent from the storage device 210 via the network 20 and the network I/F unit 221 in the predetermined time slots are written. In the next time period, the image data are transmitted from the terminal device I/F units 241–244 to the respective terminal devices T1–T4. The other data transmission devices 202–204 perform the same operations.

In this case, the CPU 223 of each of the data transmission devices 201–204 has to transmit image data in a predetermined time slot. Therefore, each memory 222 of the data transmission devices 201–204 is provided with the control table copy unit 226 shown in FIG. 30 and the system time period reception unit 227, and carries out the same operations as in the third embodiment.

Figure 30:
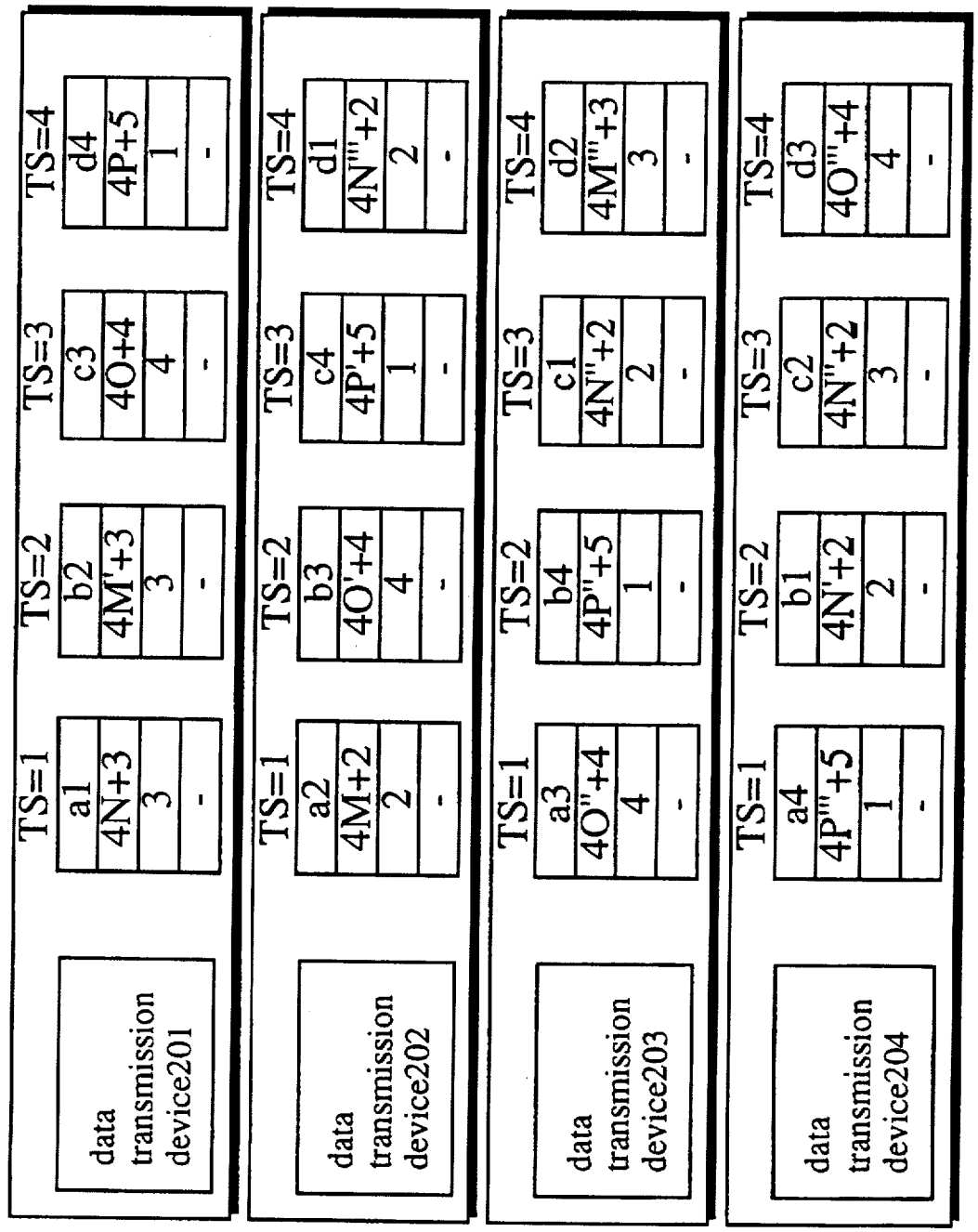
FIG. 30 shows the contents of the control table copied in the memory of the data transmission device 21.

FIG. 30 shows a copy of the state of the time period K+1 shown in FIG. 28. The operations of the present embodiment are different from those of the third embodiment in that when an image data transmission is requested, image data in the data transmission devices 201–204 are copied by the master and transmitted to the slaves. The data transmission devices 21–24 are synchronized based on the copied data, and perform the same operations as in the third embodiment.

In the present embodiment, the master controls slaves by incorporating the system control unit 50 including CPU51 into the data transmission device, which leads to the reduction of the hardware. The hardware can be interface between the storage device and the data transmission devices, CPU for control, or buffer memories to be used for image reproduction or image data readout time adjustment.

Figure 31:
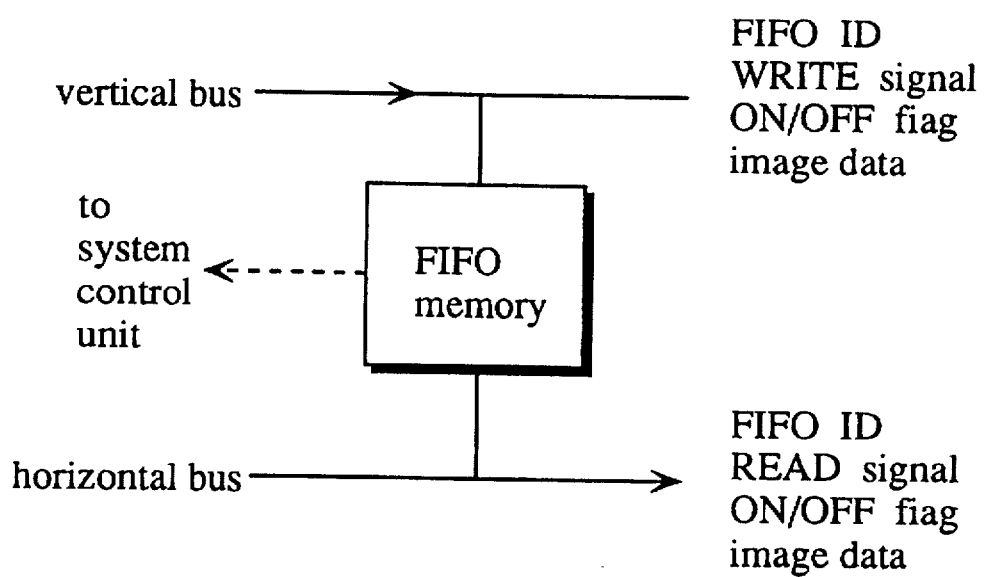
FIG. 31 shows the access to the memory in the network 20.

FIG. 31 shows the access to the memory in the network 20, which is a function unique to the present embodiment. In this figure, a broken line indicates an FIFO memory state monitoring line for checking the possibility of reading or writing image data from/to FIFO memories. The broken line is connected with the system control unit 501.

FIGS. 32a and 32b show the change of image data for each terminal device to be stored in each FIFO memory of the network 20 in the present embodiment in accordance with the change in the contents of the slot table of the first and second embodiments. The top tables show the change in the contents of the slot table and the bottom tables show the change in the data storage positions in the network 20. The data storage positions in the network 20 are shifted in the horizontal direction along with the passage of time periods. The feature of the second embodiment can be achieved by making the system control unit 50 necessary process, based on the relations shown in the tables. Needless to say, each of the buffer memories 401–416 has three areas in this case.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of terminal devices for making requests for desired video programs and displaying the video programs;

a program request reception means for receiving the requests from said plurality of terminal devices;

a terminal device control means for holding information on the requests received by said program request reception means;

a plurality of buffer memories each provided for a respective one of said plurality of terminal devices, each of said plurality of buffer memories having at least three storage areas for temporarily storing the image data sections which have been read by said plurality of readout means in one time;

a plurality of buffer memory control means for determining a storage area of each of said plurality of buffer memories to store each of the image data sections which have been read out by said plurality of readout means and for determining a time to transfer the image data sections temporarily stored in each storage area to said plurality of terminal devices along the story of the video program;

an image data transmission means for transmitting the temporarily stored image data sections to said plurality of terminal devices at the time determined by said plurality of buffer memory control means;

a time period recognition means for recognizing every time period;

a readout number recognition means for recognizing a number of reading the image data sections from the storage media in every recognized time period;

a slot table formation means for forming a slot table which shows each of the image data sections to be read from each of the storage media by each of said plurality of terminal devices in every time period in every number of reading the image data sections recognized by said readout number recognition means, and for giving a readout right to each of said plurality of terminal devices;

a readout control means for making each of said plurality of readout means read the image data sections of a requested video program from the series of the storage media by referring to the slot table and the information held by said terminal device control means;

a slot table update means for controlling said slot table formation means to update the slot table and to give each of said plurality of terminal devices the readout right, based on the recognized time period;

a free slot detection means for detecting a free slot, which is not assigned any terminal device, by referring to the slot table;

a pre-read control means for, in response of a detection of a free slot, controlling said slot table update means to assign the free slot and a next slot to a terminal device which is originally assigned to the next slot, to pre-read image data sections, and to store the pre-read image data sections in the at least three storage areas of a corresponding buffer memory;

a slot deletion means for, when the terminal device assigned two consecutive slots is detected, controlling said slot table update means to delete a latter slot of the two consecutive slots by referring to the slot table;

a slot position change means for changing positions of slots in the slot table by controlling said pre-read control means and said slot deletion means; and a free slot separation means for, when there are a plurality of free slots, separating the plurality of free slots at an equal interval by controlling said slot position change means.

2. The video-on-demand system of claim 1 further comprising:

a free-slot-use different-speed transmission means for, when a said terminal device has made a request for a video program at a different reproduction speed from a normal reproduction speed, judging a presence or absence of free slots separated by said free slot separation means and for, if the free slots are present, controlling said slot table update means to transmit image data sections for the video program at a requested reproduction speed by using the separated free slots.

3. The video-on-demand system of claim 2 further comprising:

a slot collision prediction means for predicting a possibility of a slot collision between the terminal device which has made the request at the different reproduction speed and other terminal devices which receive image data sections at the normal reproduction speed, when the slot table is updated in a future time period and when a current slot position changing procedure is continued, by referring to the slot table; and a collision evasion means for, when there is a possibility of slot collision, controlling said slot position change means to change positions of slots for one of the terminal device that has made the request at the different reproduction speed and at least one terminal device that receives image data sections at the normal reproduction speed.

4. The video-on-demand system of claim 2 further comprising:

a slot collision prediction means for predicting a possibility of a slot collision between the terminal device which has made the request at the different reproduction speed and other terminal devices which receive image data sections at the normal reproduction speed, when the slot table is updated in a future time period and when a current slot position changing procedure is continued, by referring to the slot table; and a collision evasion slot deletion means for, when there is a possibility of slot collision, controlling said pre-read control means to make image data sections be pre-read to one of the terminal devices involved in the slot collision in a time period prior to an occurrence of the collision, the image data sections being supposed to be read in a time period when the collision should have been caused, and for controlling said slot table update means to delete a slot used for the pre-reading in the time period when the collision should have been caused.

5. A video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of terminal devices for making requests for desired video programs and displaying the video programs;

a program request reception means for receiving the requests from said plurality of terminal devices;

a terminal device control means for holding information on the requests received by said program request reception means;

a plurality of buffer memories each provided for a respective one of said plurality of terminal devices, each of said plurality of buffer memories having at least three storage areas for temporarily storing the image data sections which have been read by said plurality of readout means in one time;

a plurality of buffer memory control means for determining a storage area of each of said plurality of buffer memories to store each of the image data sections which have been read out by said plurality of readout means and for determining a time to transfer the image data sections temporarily stored in each storage area to said plurality of terminal devices along the story of the video program;

an image data transmission means for transmitting the temporarily stored image data sections to said plurality of terminal devices at the time determined by said plurality of buffer memory control means;

a time period recognition means for recognizing every time period;

a readout number recognition means for recognizing a number of reading the image data sections from the storage media in every recognized time period;

a slot table formation means for forming a slot table which shows each of the image data sections to be read from each of the storage media by each of said plurality of terminal devices in every time period in every number of reading the image data sections recognized by said readout number recognition means, and for giving a readout right to each of said plurality of terminal devices;

a readout control means for making each of said plurality of readout means read the image data sections of a requested video program from the series of the storage media by referring to the slot table and the information held by said terminal device control means;

a slot table update means for controlling said slot table formation means to update the slot table and to give each of said plurality of terminal devices the readout right, based on the recognized time period;

a free slot detection means for detecting a free slot, which is not assigned any terminal device, by referring to the slot table;

a pre-read control means for, in response of a detection of a free slot, controlling said slot table update means to assign the free slot and a next slot to a terminal device which is originally assigned to the next slot, to pre-read image data sections, and to store the pre-read image data sections in the at least three storage areas of a corresponding buffer memory;

a slot deletion means for, when the terminal device assigned two consecutive slots is detected, controlling said slot table update means to delete a latter slot of the two consecutive slots by referring to the slot table;

a slot position change means for changing positions of slots in the slot table by controlling said pre-read control means and said slot deletion means;

a program head position storage/detection means for detecting a said storage medium which stores a head image data section of the video program requested from the terminal device from among the storage media, said program head position detection means previously storing all storage media which hold a head image data section of any video program;

a slot assignment means for checking a presence or absence of a first free slot in a said storage medium which is in an upper stream than the storage medium which has been detected by said program head position detection means and further checking a presence or absence of a second free slot in all the storage media by referring to the slot table, and for, if the first free slot is present, controlling said slot table update means to assign the first free slot to the terminal device which has made the request for the vide program when the first free slot is assigned to the storage medium which stores the head image data section of the video program; and a slot change means for, when said slot assignment means has determined the absence of the first free slot and the presence of the second free slot, recognizing a first slot which is in the upper stream than the slot belonging to the storage medium which holds the head image data section and a second slot which is in the lower stream than a free slot which is in the upper stream than the first slot and closest to the first slot, for checking whether image data sections to be transferred to terminal devices assigned to the first slot, the second slot, and other slots between the first slot and the second slot are pre-read, and for, when the image data sections to be transferred to all the terminal devices are pre-read, assigning a new terminal device to a slot, without changing positions of the first slot, the second slot, and the other slots for the terminal devices when the slot table is updated next time.

6. The video-on-demand system of claim 5, wherein said slot assignment means comprising:

a register unit for registering one as a number of storage media in which a presence or absence of the first free slot is checked.

7. A method for adjusting positions of slots in a video-on-demand system, said video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of buffer memories each provided for a respective one of said plurality of terminal devices, each of said plurality of buffer memories having at least three storage areas for temporarily storing the image data sections which have been read by said plurality of readout means in one time;

a plurality of buffer memory control means for determining a storage area of each of said plurality of buffer memories to store each of the image data sections which have been read out by said plurality of readout means and for determining a time to transfer the image data sections temporarily stored in each storage area to said plurality of terminal devices along the story of the video program;

a slot table formation means for forming a slot table which shows each of the image data sections to be read from each of the storage media by each of said plurality of terminal devices in every time period in every number of reading the image data sections recognized by said readout number recognition means, and for giving a readout right to each of said plurality of terminal devices; and a readout control means for making each of said plurality of readout means read image data sections of a requested video program, by referring to the slot table, said method comprising the steps of:

detecting a free slot, which is not assigned any terminal device, by referring to the slot table;

assigning the free slot and a next slot to a terminal device which is originally assigned to the next slot, pre-reading image data sections, and storing the pre-read image data sections in the at least three storage areas of a corresponding buffer memory, in response of a detection of a free slot;

deleting a latter slot of the two consecutive slots by referring to the slot table, when the terminal device assigned two consecutive slots is detected;

changing positions of slots in the slot table; and separating the plurality of free slots at an equal interval, when there are a plurality of free slots.

8. The method of claim 7 further comprising the step of:

judging, when a said terminal device has made a request for a video program at a different reproduction speed from a normal reproduction speed, a presence or absence of free slots separated and if the free slots are present, transmitting image data sections for the video program at a requested reproduction speed by using the separated free slots.

9. The method of claim 8 further comprising the steps of:

predicting a possibility of a slot collision between the terminal device which has made the request at the different reproduction speed and other terminal devices which receive image data sections at the normal reproduction speed, when the slot table is updated in a future time period and when a current slot position changing procedure is continued, by referring to the slot table; and changing positions of slots for one of the terminal device that has made the request at the different reproduction speed and at least one terminal device that receives image data sections at the normal reproduction speed, when there is a possibility of slot collision.

10. The method of claim 8 further comprising the steps of:

predicting a possibility of a slot collision between the terminal device which has made the request at the different reproduction speed and other terminal devices which receive image data sections at the normal reproduction speed, when the slot table is updated in a future time period and when a current slot position changing procedure is continued, by referring to the slot table;

pre-reading image data sections to one of the terminal devices involved in the slot collision in a time period prior to an occurrence of the collision, the image data sections being supposed to be read in a time period when the collision should have been caused, in a case where there is a possibility of slot collision; and deleting a slot used for the pre-reading in the time period when the collision should have been caused.

11. A method for adjusting positions of slots in a video-on-demand system, said video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of buffer memories each provided for a respective one of said plurality of terminal devices, each of said plurality of buffer memories having at least three storage areas for temporarily storing the image data sections which have been read by said plurality of readout means in one time;

a plurality of buffer memory control means for determining a storage area of each of said plurality of buffer memories to store each of the image data sections which have been read out by said plurality of readout means and for determining a time to transfer the image data sections temporarily stored in each storage area to said plurality of terminal devices along the story of the video program;

a slot table formation means for forming a slot table which shows each of the image data sections to be read from each of the storage media by each of said plurality of terminal devices in every time period in every number of reading the image data sections recognized by said readout number recognition means, and for giving a readout right to each of said plurality of terminal devices; and a readout control means for making each of said plurality of readout means read image data sections of a requested video program, by referring to the slot table, said method comprising the steps of:

detecting a free slot, which is not assigned any terminal device, by referring to the slot table;

assigning the free slot and a next slot to a terminal device which is originally assigned to the next slot, pre-reading image data sections, and storing the pre-read image data sections in the at least three storage areas of a corresponding buffer memory, in response of a detection of a free slot;

deleting a latter slot of the two consecutive slots by referring to the slot table, when the terminal device assigned two consecutive slots is detected;

changing positions of slots in the slot table;

detecting a said storage medium which stores a head image data section of the video program requested from the terminal device from among the storage media by previously storing all storage media which hold a head image data section of any video program;

checking a presence or absence of a first free slot in a said storage medium which is in an upper stream than the storage medium which has been detected and further checking a presence or absence of a second free slot in all the storage media by referring to the slot table, and if the first free slot is present, assigning the first free slot to the terminal device which has made the request for the vide program when the first free slot is assigned to the storage medium which stores the head image data section of the video program;

recognizing a first slot which is in the upper stream than the slot belonging to the storage medium which holds the head image data section and a second slot which is in the lower stream than a free slot which is in the upper stream than the first slot and closest to the first slot, when the first free slot is absent and the second free slot is present;

checking whether image data sections to be transferred to terminal devices assigned to the first slot, the second slot, and other slots between the first slot and the second slot are pre-read; and assigning a new terminal device to a slot when the image data sections to be transferred to all the terminal devices are pre-read, without changing positions of the first slot, the second slot, and the other slots for the terminal devices when the slot table is updated next time.

12. The method of claim 11, wherein the step of assigning a new terminal device to a slot is a step of registering one as a number of storage media in which a presence or absence of the first free slot is checked.

13. A video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of terminal devices for making requests for desired video programs and displaying the video programs;

a program request reception means for receiving the requests from said plurality of terminal devices; a terminal device control means for holding information on the requests received by said program request reception means;

a plurality of image data transmission means for transmitting image data sections to at least one of said plurality of terminal devices in order of reproduction;

a plurality of memories for temporarily storing image data sections which have been read from a specified one of the storage media and distributing the image data sections to a specified one of said plurality of data transmission devices;

a plurality of horizontal buses for transmitting image data sections which have been read from the specified one of the storage media serially to said plurality of memories;

a plurality of vertical buses for transmitting the image data sections which are temporarily stored in said plurality of memories serially to said plurality of image data transmission means;

a time period recognition means for recognizing every time period;

a readout number recognition means for recognizing a number of reading the image data sections from the storage media in every recognized time period;

a slot table formation means for forming a slot table which shows each of the image data sections to be read from each of the storage media by each of said plurality of terminal devices in every time period in every number of reading the image data sections recognized by said readout number recognition means, and for giving a readout right to each of said plurality of terminal devices;

a readout control means for making each of said plurality of readout means read the image data sections of a requested video program from the series of the storage media by referring to the slot table and the information held by said terminal device control means;

a slot table update means for controlling said slot table formation means to update the slot table and to give each of said plurality of terminal devices the readout right, based on the recognized time period; and a horizontal/vertical bus control means for controlling said plurality of horizonal buses and said plurality of vertical buses to avoid an occurrence of slot collision and further controlling said slot table formation means to give the readout right without causing a collision.

14. The video-on-demand system of claim 13 further comprising:

a synchronization signal generation means for generating synchronization signals related at least to said time period recognition means;

wherein said time period recognition means, said readout number recognition means, said slot table formation means, said readout control means, and said slot table update means compose a master unit, and each of said plurality of image data transmission means is a slave unit composed of at least one storage medium and a readout means incorporated into the at least one storage medium, said plurality of image data transmission means comprising:

a synchronization signal reception unit for receiving the synchronization signals;

a slot table copy/storage unit for copying and storing the slot table held by the master unit, based on a received synchronization signal, every time the slot table is updated; and a synchronization control unit for making said plurality of readout means read image data sections from the storage media and transfer the image data sections to said plurality of horizontal buses, making said plurality of image data transmission means read image data sections from said plurality of vertical buses and transmit the image data sections to a corresponding terminal device, and further making said horizonal/vertical bus control means control said plurality of horizontal buses and said plurality of vertical buses, by referring to the slot table held in said slot table copy/storage unit and by using the synchronization signal received by said synchronization signal reception unit.

15. A method for reading and transmitting image data in a video-on-demand system, said video-on-demand system comprising:

a storage means for compressing image data of a video program and dividing the image data into image data sections with a predetermined length and storing each of the image data sections in one of a series of storage media in order of reproduction, returning to a first storage medium in the series after reaching a final storage medium in the series, along a story of the video program;

a plurality of readout means for serially reading the image data sections from the series of the storage media per time period for a predetermined number of times by time sharing, the time period corresponding to a time required for reproducing and displaying original images for one image data section and being divided into slots whose number is determined by a ratio of compressed image data to original image data;

a plurality of terminal devices for making requests for desired video programs and displaying the video programs;

a plurality of image data transmission means for transmitting image data sections to at least one of said plurality of terminal devices in order of reproduction;

a plurality of memories for temporarily storing image data sections which have been read from a specified one of the storage media and distributing the image data sections to a specified one of said plurality of data transmission devices;

a plurality of horizontal buses for transmitting image data sections which have been read from the specified one of the storage media serially to said plurality of memories; and a plurality of vertical buses for transmitting the image data sections which are temporarily stored in said plurality of memories serially to said plurality of image data transmission means;

said method comprising the steps of:

transferring image data sections read from each of the storage media serially to said plurality of memories and temporarily storing the image data sections transferred in said plurality of memories;

transferring image data sections which are temporarily stored in said plurality of memories to said plurality of image data transmission means by reading the image data sections serially;

forming a slot table which shows each of the image data sections to be read from each of the storage media by each of said plurality of terminal devices in every time period in every number of reading the image data sections recognized, and giving a readout right to each of said plurality of terminal devices;

reading the image data sections of a requested video program from the series of the storage media by referring to the slot table; and controlling said plurality of horizontal buses and said plurality of vertical buses to avoid an occurrence of slot collision and further controlling the step of forming the slot table to give the readout right without causing a collision.

16. The method of claim 15 further comprising the steps of:

generating synchronization signals related at least to the step of forming the slot table;

receiving the synchronization signals;

copying and storing the slot table, based on a received synchronization signal, every time the slot table is updated; and controlling readout of image data sections from said plurality of vertical buses and transmission of the image data sections to a corresponding terminal device, and further controlling said plurality of horizontal buses and said plurality of vertical buses by referring to the slot table and the synchronization signal received.

* * * * *

UNITED STATES PATENT AND TRADEMARK OFFICE
CERTIFICATE OF CORRECTION

PATENT NO : 5,764,893
DATED : June 9, 1998
INVENTOR(S): Tadashi Okamoto et al.

It is certified that error appears in the above-identified patent and that said Letters Patent is hereby corrected as shown below:

On the cover page, under [73] Assignee delete,

"Matsushita Electrical Co. Ltd." and insert

--Matsushita Industrial Co., Ltd.--.

Signed and Sealed this

Sixteenth Day of November, 1999

Attest:

Q. TODD DICKINSON

*Attesting Officer*    *Acting Commissioner of Patents and Trademarks*